United States Patent
Furukawa et al.

(10) Patent No.: US 7,609,942 B2
(45) Date of Patent: Oct. 27, 2009

(54) RECORDING DEVICE AND METHOD, SALVAGE DEVICE AND METHOD, AND PROGRAM

(75) Inventors: Takashi Furukawa, Kanagawa (JP); Hideki Ando, Kanagawa (JP); Hisao Tanaka, Tokyo (JP); Kazuyuki Sugizaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1268 days.

(21) Appl. No.: 10/491,378

(22) PCT Filed: Aug. 1, 2003

(86) PCT No.: PCT/JP03/09788

§ 371 (c)(1),
(2), (4) Date: Mar. 31, 2004

(87) PCT Pub. No.: WO2004/013858

PCT Pub. Date: Feb. 12, 2004

(65) Prior Publication Data

US 2004/0213030 A1     Oct. 28, 2004

(30) Foreign Application Priority Data

Aug. 2, 2002    (JP)    ............................. 2002-225645

(51) Int. Cl.
*H04N 5/91* (2006.01)
(52) U.S. Cl. ......................................... 386/95; 386/126
(58) Field of Classification Search ................... 386/46, 386/95, 125, 126; 369/53.73
See application file for complete search history.

(56) References Cited

U.S. PATENT DOCUMENTS 5,598,391 A * 1/1997 Mukawa .................. 369/53.37

(Continued)

FOREIGN PATENT DOCUMENTS

EP        0 971 358        1/2000

(Continued)

OTHER PUBLICATIONS

Anonymous: "Volume and File Structure for Write-Once and Rewritable Media Using Non-Sequential Recording for Information Interchange" ECMA Publications, Online! Jun. 1997, XP002343823 Retrieved from the Internet: URL:http://www.ecma-international.org/publications/files/ECMA-ST/Ecma-167.pdf> retrieved on Sep. 7, 2005!.

(Continued)

*Primary Examiner*—Huy T Nguyen
(74) *Attorney, Agent, or Firm*—Frommer Lawrence & Haug LLP; William S. Frommer; Thomas F. Presson

(57) ABSTRACT

A recording apparatus, a recording method, a salvage apparatus, a salvage method, and a program for reading data from a recording medium that has failed to normally end a recording process. Each of salvage markers contains a recognition pattern for recognizing a salvage marker, and identification information for identifying files to which audio data "Audio", and video data "Video" belong. If the recording process fails to end in a normal state, the salvage markers are detected from the recognition pattern contained in the salvage markers, and the file having the audio data and the video data belonging thereto is identified by the file identification information. The present invention is applicable to a video processing apparatus.

26 Claims, 26 Drawing Sheets

U.S. PATENT DOCUMENTS 6,954,830 B2 * 10/2005 Yamada et al. .............. 711/154

FOREIGN PATENT DOCUMENTS

| EP | 1 102 275 | 5/2001 |
| EP | 1 263 226 | 12/2002 |
| JP | 63 278154 | 11/1988 |
| JP | 2 281322 | 11/1990 |
| JP | 8-227372 | 9/1996 |
| JP | 9-102183 | 4/1997 |
| JP | 11 96687 | 4/1999 |
| JP | 2001-143439 | 5/2001 |
| JP | 2001 195837 | 7/2001 |
| JP | 2002-197839 | 7/2002 |
| WO | WO 01 31651 | 5/2001 |

OTHER PUBLICATIONS

Patent Abstracts of Japan, vol. 2002, No. 12, Dec. 12, 2002 & JP 2002 237139 A (Sharp Corp), Aug. 23, 2002.

Anonymous: "Technology Enabling New Workflows" XDCAM Sony, Online! 2003, XP002343612 Retrieved from the Internet: URL:http://www.panavision.co.nz/main/kbase/downloads/xdcam_system.pdf> retrieved on Sep. 6, 2005!.

* cited by examiner

FIG. 15

| | |
|---|---|
| SALVAGE ID | ~61 |
| RECORDING TIME INFORMATION | ~62 |
| IDENTIFICATION INFORMATION FOR IDENTIFYING FILE | ~63 |
| RECORDING ORDER ID | ~64 |
| DATA LOCATION INFORMATION | ~65 |
| DEFECT POSITION INFORMATION | ~66 |

FIG. 24

| FILE NAME | SEGMENTS CONTAINED IN FILE |
|---|---|
| AUDIO DATA FILE | AUDIO 1, AUDIO 2, AUDIO 3, . . . . . |
| VIDEO DATA FILE | VIDEO 1, VIDEO 2, VIDEO 3, . . . . . |

FIG. 25

| | |
|---|---|
| SALVAGE ID | ~51 |
| RECORDING TIME INFORMATION | ~52 |
| IDENTIFICATION INFORMATION FOR IDENTIFYING AUDIO DATA FILE | ~53—1 |
| IDENTIFICATION INFORMATION FOR IDENTIFYING VIDEO DATA FILE | ~53—2 |
| RECORDING ORDER ID | ~54 |
| DATA LOCATION INFORMATION | ~55 |
| POINTER INFORMATION | ~56 |

RECORDING DEVICE AND METHOD, SALVAGE DEVICE AND METHOD, AND PROGRAM

TECHNICAL FIELD

The present invention relates to a recording apparatus, a recording method, a salvage apparatus, a salvage method, and a program and, in particular, to a recording apparatus, a recording method, a salvage apparatus, a salvage method, and a program for reading data from a recording medium that has failed to normally end a recording process.

BACKGROUND ART

Tape and optical disks are known as recording media for recording video picked up by a camcorder. When data of picked-up video (and picked-up audio) (in the following discussion, the video data and the audio data are collectively referred to as AV data) is recorded onto a random-access recording medium such as an optical disk, the video (and audio) is more quickly replayed from a desired position than in the counterpart recorded on tape.

The AV data recorded on the recording medium such as the optical disk is managed by a file system. To record the AV data onto a recording medium, a recording apparatus generates a file name to uniquely determine a series of AV data. After completing the recording of the AV data onto the recording medium, the recording apparatus records information such as a file name and recording position of the AV data on the recording medium onto the recording medium in a predetermined management structure. The file system contains the file name and the information containing the recording position of the AV data on the recording medium.

Japanese Unexamined Patent Application Publication No. 11-88821 discloses an optical disk in which management data containing address information, such as a record start position and a record end position of each file, is recorded.

The data recorded onto the recording medium such as an optical disk is managed by the file system. For example, to replay the AV data from the recording medium, a replay apparatus acquires a file name of at least one file recorded on the recording medium, and information such as a recording position of each file on the recording medium by referencing the file system recorded on the recording medium. When a user instructs the replay apparatus to replay a desired file, the replay apparatus determines the recording position of the designated file based on the file system, reads the AV data from the recording position, and replays the AV data. The recording position is not limited to a single position, and the AV data is sometimes split at a plurality of recording positions on the recording medium. In such a case, the file system stores a plurality of recording positions for the single file. Even when the file which is distributed among the plurality of recording areas is replayed, all data distributed is read based on the file system.

However, while a known recording apparatus records the AV data on a random-access optical disk, power to the recording apparatus may be interrupted and a recording process may be suspended. If the recording process is interrupted, the replay apparatus is unable to recognizes a series of AV data that is recorded until the interruption of the recording process because the recording of the file name and the information such as the recording position are not yet complete. The series of AV data is not replayed.

DISCLOSURE OF INVENTION

The present invention has been developed in view of the above drawback, and it is an object of the present invention to allow recorded data to be read even if a recording process fails to normally end.

A recording apparatus of the present invention includes generator means for generating a marker that contains a recognition pattern set beforehand for each of segment files in which at least one of the files is segmented, and salvage processing information that is used in a salvage (restoration) process of a file that is recorded on the recording medium but in an unrecognizable state as a file, and recording means for recording the segment file and the marker onto the recording medium so that the segment file and the marker are arranged on the recording medium in a predetermined order.

The generator means may generate the marker that contains the salvage processing information for each segment file of the plurality of segment files in which each file of the plurality of files is segmented, and the recording means may record the plurality of segment files corresponding to each file of the plurality of files and the marker on the recording medium in the predetermined order.

The salvage processing information may contain information relating to a recording area of each of the segment files.

The salvage processing information may contain type information indicating the type of the data.

The salvage processing information may contain information for identifying each of the files.

The salvage processing information may contain information relating to the segment file arranged subsequent to the marker containing the salvage processing information.

The salvage processing information may contain information relating to the segment file arranged prior to the marker containing the salvage processing information.

The salvage processing information may contain information relating to the segment files arranged prior to and subsequent to the marker containing the salvage processing information.

The salvage processing information may contain information relating to a recording position, on the recording medium, of a marker that is recorded on the recording medium subsequent to the marker containing the salvage processing information.

The salvage processing information may contain time information corresponding to a timing of the recording of the marker.

The salvage processing information may contain information relating to the recording order of the marker.

The salvage processing information may contain information indicating a position, on the recording medium, of a defect taking place at the recording of the segment file arranged prior to the marker containing the salvage processing information.

A recording method of the present invention includes a generating step for generating a marker that contains a recognition pattern set beforehand for each of segment files in which at least one of the files is segmented, and salvage processing information that is used in a salvage process of a file that is recorded on the recording medium but in an unrecognizable state as a file, and a recording step for recording the segment file and the marker onto the recording medium so that the segment file and the marker are arranged on the recording medium in a predetermined order.

The marker that contains the salvage processing information for each segment file of the plurality of segment files in which each file of the plurality of files is segmented may be generated in the generating step, and the plurality of segment files corresponding to each file of the plurality of files and the marker may be recorded on the recording medium in the predetermined order in the recording step.

The salvage processing information may contain information relating to a recording area of each of the segment files.

The salvage processing information may contain type information indicating the type of the data.

The salvage processing information may contain information for identifying each of the files.

The salvage processing information may contain information relating to the segment file arranged subsequent to the marker containing the salvage processing information.

The salvage processing information may contain information relating to the segment file arranged prior to the marker containing the salvage processing information.

The salvage processing information may contain information relating to the segment files arranged prior to and subsequent to the marker containing the salvage processing information.

The salvage processing information may contain information relating to a recording position, on the recording medium, of a marker that is recorded on the recording medium subsequent to the marker containing the salvage processing information.

The salvage processing information may contain time information corresponding to a timing of the recording of the marker.

The salvage processing information may contain information relating to the recording order of the marker.

The salvage processing information may contain information indicating a position, on the recording medium, of a defect taking place at the recording of the segment file arranged prior to the marker containing the salvage processing information.

A first program of the present invention causes a computer to execute a recording method and the recording method includes a generating step for generating a marker that contains a recognition pattern set beforehand for each of segment files in which at least one of the files is segmented, and salvage processing information that is used in a salvage process of a file that is recorded on the recording medium but in an unrecognizable state as a file, and a recording control step for controlling the recording of the segment file and the marker on the recording medium so that the segment file and the marker are arranged on the recording medium in a predetermined order.

A salvage apparatus of the present invention includes determining means for determining whether a recording process for recording a marker and a segment file on a recording medium in a predetermined order is normally completed, wherein the marker contains a recognition pattern set beforehand for each of the segment files in which at least one of files is segmented, and salvage processing information that is used in a salvage process of a file that is recorded on the recording medium but in an unrecognizable state as a file, detecting means for detecting at least one of the markers recorded on the recording medium based on the recognition pattern if the determining means determines that the recording of the file to the recording medium is not normally completed, identifying means for identifying data formed of the same file based on the salvage processing information contained in the marker, and registering means for registering the data identified by the identifying means as the data of the same file in a file system.

A salvage method of the present invention includes a determining step for determining whether a recording process for recording a marker and a segment file on a recording medium in a predetermined order is normally completed, wherein the marker contains a recognition pattern set beforehand for each of the segment files in which at least one of files is segmented, and salvage processing information that is used in a salvage process of a file that is recorded on the recording medium but in an unrecognizable state as a file, a detecting step for detecting at least one of the markers recorded on the recording medium based on the recognition pattern if the determining step determines that the recording of the file to the recording medium is not normally completed, an identifying step for identifying data formed of the same file based on the salvage processing information contained in the marker, and a registering step for registering the data identified in the identifying step as the data of the same file in a file system.

A second program of the present invention causes a computer to perform a salvage method, and the salvage method includes a determining step for determining whether a recording process for recording a marker and a segment file on a recording medium in a predetermined order is normally completed, wherein the marker contains a recognition pattern set beforehand for each of the segment files in which at least one of files is segmented, and salvage processing information that is used in a salvage process of a file that is recorded on the recording medium but in an unrecognizable state as a file, a detecting step for detecting at least one of the markers recorded on the recording medium based on the recognition pattern if the determining step determines that the recording of the file to the recording medium is not normally completed, an identifying step for identifying data formed of the same file based on the salvage processing information contained in the marker, and a registering step for registering the data identified in the identifying step as the data of the same file in a file system.

In the recording apparatus, the recording method, and the program in accordance with the present invention, the marker is generated. The marker contains the recognition pattern set beforehand for each of segment files in which at least one of the files is segmented, and salvage processing information that is used in a salvage process of a file that is recorded on the recording medium but in an unrecognizable state as a file. The segment file and the marker are recorded onto the recording medium so that the segment file and the marker are arranged on the recording medium in the predetermined order.

In the salvage apparatus, the salvage method, and the program in accordance with the present invention, a determination is made of whether the recording process for recording the marker and the segment file on the recording medium in the predetermined order is normally completed, wherein the marker contains the recognition pattern set beforehand for each of the segment files in which at least one of files is segmented, and the salvage processing information that is used in the salvage process of the file that is recorded on the recording medium but in the unrecognizable state as a file. At least one of the markers recorded on the recording medium is detected based on the recognition pattern if it is determined that the recording of the file to the recording medium is not normally completed. Data formed of the same file is identified based on the salvage processing information contained in the marker. The identified data is registered as the data of the same file in the file system.

BRIEF DESCRIPTION OF THE DRAWINGS

FIG. 15 illustrates an example of the salvage marker.

FIG. 24 illustrates the registration of files to the file system.

FIG. 25 illustrates an example of the salvage marker.

BEST MODE FOR CARRYING OUT THE INVENTION

Figure 1:
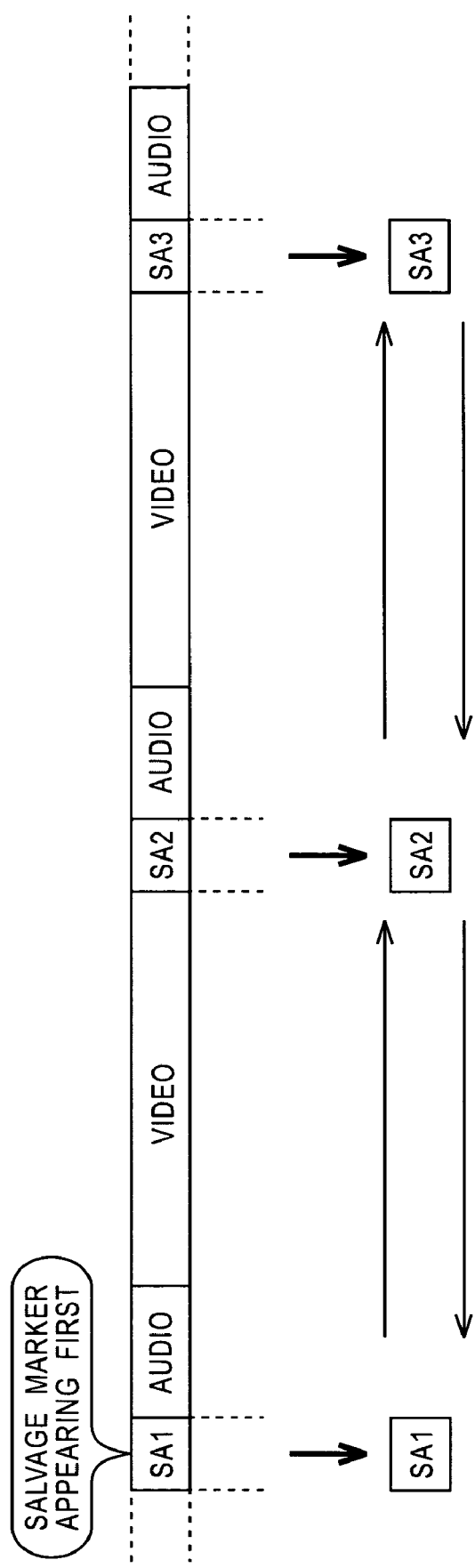
FIG. 1 is a chart roughly illustrating the present invention.

FIG. 1 illustrates one concept of the present invention. In accordance with the present invention, a marker is recorded between pieces of data when data such as video or audio managed in a file is recorded onto a recording medium. If a recording process fails to normally end, in other words, if the data recorded onto the recording medium has not been registered in a file system as a single file, the recording position of the data on the recording medium which was recorded until the interruption of the recording process is determined by referencing the marker. Based on the recording position, the data is registered as a file in the file system. Even if the recording process fails to normally end, the data that was recorded until the interruption of the recording process is recognized as a file, and is set be in a replayable state. In the discussion that follows, the marker recorded between pieces of data is referred to as a salvage marker.

FIG. 1 illustrates one example of recording order of data. As shown in FIG. 1, "SA1", "SA2", and "SA3" represent salvage markers. "Audio" represents audio data. "Video" represents video data. Arranged in the order from left to right in FIG. 1 are the salvage marker SA1, the audio data, the video data, the salvage marker SA2, the audio data, the video data, the salvage marker SA3, and the audio data.

The salvage marker contains a recognition pattern (hereinafter referred to as a salvage ID) identifying the salvage marker, and identification information (a file name is acceptable, for example) for identifying a file. The recording and replay apparatus detects the salvage marker by searching for the salvage ID. The salvage marker may contain another information, of which more is discussed later.

The recording and replay apparatus searches for the salvage ID on an optical disk if the optical disk is loaded back after an interruption in the middle of recording. If the salvage ID contained in the salvage marker SA1 is detected, the recording and replay apparatus reads the salvage marker SA1 recorded at a position of the salvage ID. Based on the identification information for identifying the file contained in the salvage marker SA1, the recording and replay apparatus determines that the audio data and the video data recorded subsequent to the salvage marker SA1 are data that has to belong to a file "A".

The recording and replay apparatus further searches for the salvage IDs. If a salvage ID contained in the salvage marker SA2 is found, the recording and replay apparatus determines that the audio data and the video data recorded subsequent to the salvage marker SA2 are data that has to belong to the file "A", based on the identification information for identifying the file contained in the salvage marker SA2. Likewise, the recording and replay apparatus searches for salvage IDs for the salvage marker SA3 and subsequent salvage markers, and identifies data contained in the file "A". By keeping tack of the salvage markers in this way, the audio data and the video data, unregistered in the file system, are searched for. The file "A" containing the audio data and the video data detected as a result is then registered as a single file in the file system.

Figure 2:
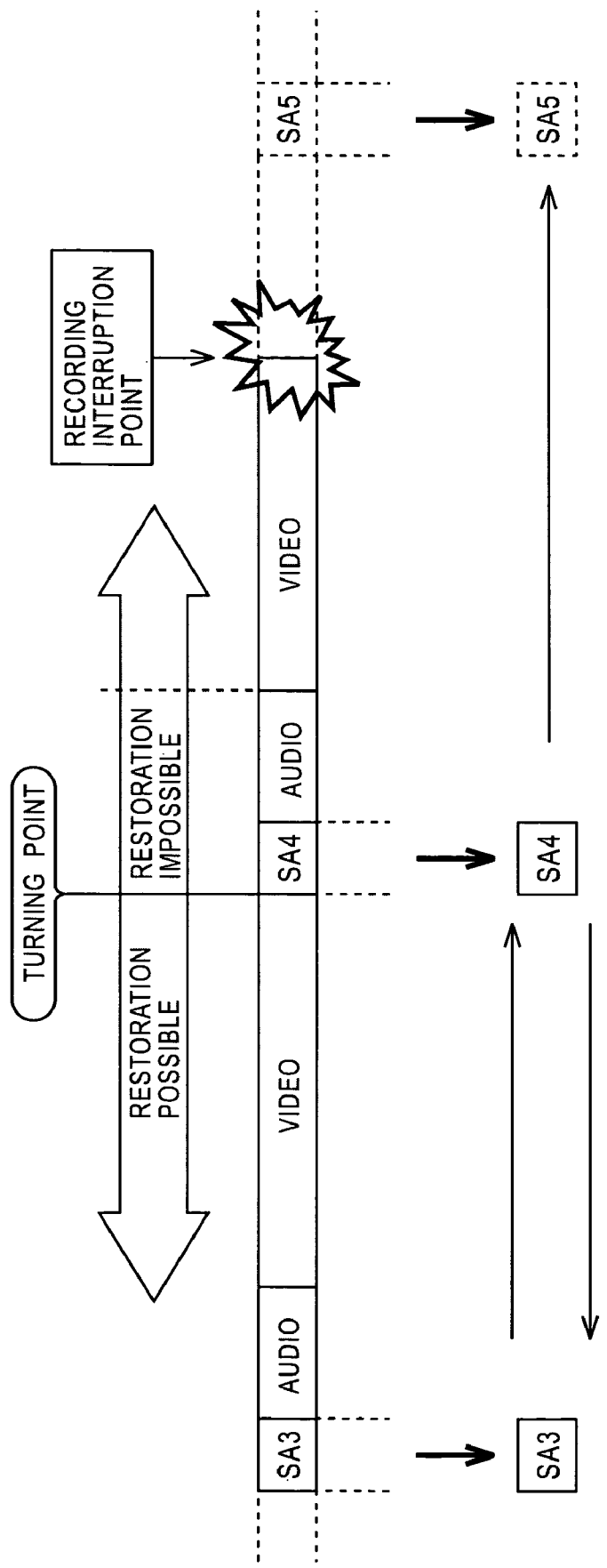
FIG. 2 is another chart roughly illustrating the present invention.

FIG. 2 illustrates a recording position at the moment the recording process is interrupted. Referring to FIG. 2, the salvage marker SA3, the audio data, the video data, the salvage marker SA4, and the audio data are arranged in the same order from left to right as shown in FIG. 1. The recording of the video data is interrupted at a position at a "recording interruption point" represented by an arrow in the middle of the video data on the right-hand side. Broken lines representing a salvage marker SA5 mean that the salvage marker SA5 is not recorded on the recording medium.

The audio data and the video data recorded between the salvage marker SA3 and the salvage marker SA4 in the vicinity of the recording interruption point can be used as data to be contained in the file, but data subsequent to the salvage marker SA4 cannot be adopted. Data prior to the salvage marker SA4 thus forms a single file. The audio data and the video data on the right of the salvage marker SA4 may be adopted. In such a case, however, there is a possibility that a video is blurred or disappears immediately prior to the end of a replay operation. By editing the data through cutting a portion of the data immediately prior to the blurring or the disappearance of the video, a user can produce a file containing all data recorded immediately prior to the recording interruption point.

In the above discussion, the audio data and the video data are contained in the same file. The audio data and the video data may be handled as separate files in FIGS. 1 and 2. In such a case, the audio data and the video data, which are detected by keeping track of the salvage markers subsequent to the record interruption as shown in FIG. 2, are registered as separate files in the file system.

Figure 3:
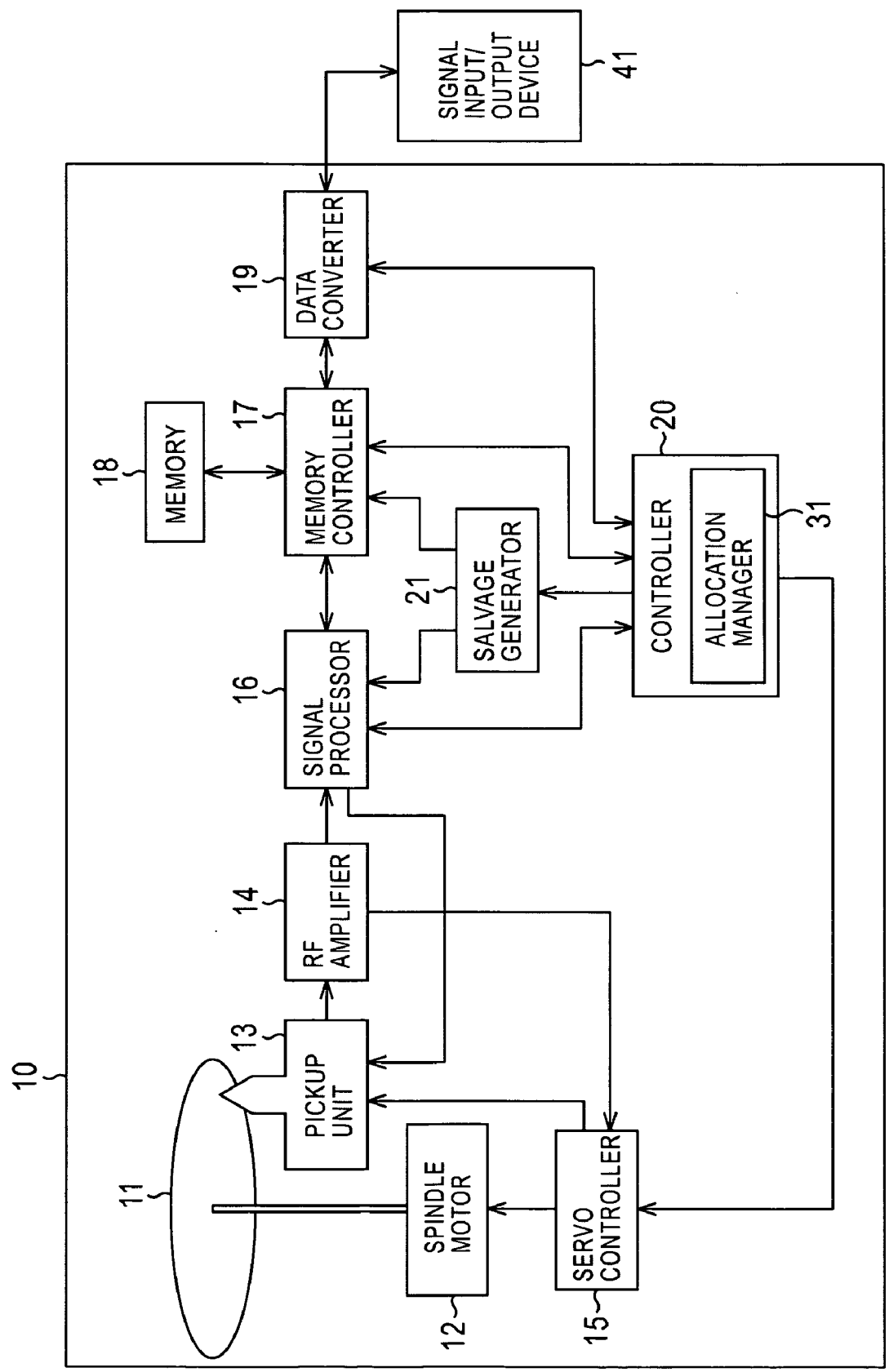
FIG. 3 is a block diagram illustrating the structure of a disk recording and replay apparatus implementing the present invention.

The present invention is now described more in detail. FIG. 3 illustrates the structure of a disk recording and replay apparatus 10 implementing the present invention.

A spindle motor 12 drives an optical disk 11 at a CLV (Constant Linear Velocity) or a CAV (Constant Angular Velocity) in response to a spindle motor drive signal from a servo controller 15.

A pickup unit 13 controls the output of a laser beam in response to a recording signal supplied from a signal processor 16, thereby recording the recording signal onto the optical disk 11. Also, the pickup unit 13 focuses and directs the laser beam onto the optical disk 11, photoelectrically converts a laser beam reflected from the optical disk 11 into a current signal, and supplies an RF amplifier 14 with the current signal. The irradiation position of the laser beam is controlled by a servo signal supplied to the pickup unit 13 from the servo controller 15.

The RF amplifier 14 generates a focus error signal, a tracking error signal, and a replay signal in response to the current signal from the pickup unit 13, supplies the servo controller 15 with the tracking error signal and the focus error signal, and supplies the signal processor 16 with the replay signal.

The servo controller 15 performs a focus servo operation and a tracking servo operation. More specifically, the servo controller 15 generates the a focus servo signal or a tracking servo signal in response to the focus error signal and the tracking error signal from the RF amplifier 14, and supplies an actuator (not shown) of the pickup unit 13 with the focus servo signal and the tracking servo signal. Furthermore, the servo controller 15 generates a spindle motor drive signal for driving the spindle motor 12, thereby performing a spindle servo operation for controlling the optical disk 11 to a desired rotational speed.

Furthermore, the servo controller 15 performs a sled control. In the sled control, the servo controller 15 moves the irradiation position of the laser beam by radially shifting the pickup unit 13 across the optical disk 11. The signal reading position of the optical disk 11 is set by a controller 20. The servo controller 15 controls the pickup unit 13 in position so that a signal is read from the set reading position.

The signal processor 16 modulates the AV data input from a memory controller 17 and a salvage marker input from a salvage generator 21 into recording signals, and feeds the recording signals to the pickup unit 13. Furthermore, the signal processor 16 generates replay data by demodulating the replay signal from the RF amplifier 14, and feeds the replay data to the memory controller 17.

The memory controller 17 causes a memory 18 to store the AV data from a data converter 19 as necessary as will be discussed later. Also, the memory controller 17 reads the AV data from the memory 18 to feed the AV data to the signal processor 16. The memory controller 17 stores, in the memory 18, the AV data contained in the replay data from the signal processor 16 as necessary, while reading the AV data from the memory 18 to feed the AV data to the data converter 19. Furthermore, the memory controller 17 stores, in the memory 18, the salvage marker contained in the replay data from the signal processor 16 as necessary, while reading the salvage marker from the memory 18 to feed the salvage marker to the controller 20.

The data converter 19 compresses a signal of an image picked by a video camera (not shown) and supplied from a signal input/output device 41 and a signal replayed from a recording medium (not shown) into AV data in accordance with the MPEG (Moving Picture Experts Group), the JPEG (Joint Photographic Experts Group), or the like and feeds the compressed AV data to the memory controller 17.

The data converter 19 decompresses the AV data contained in the replay data supplied from the memory controller 17, converts the decompressed AV data into an output signal in a predetermined format, and supplies the signal input/output device 41 with the output signal. The data converter 19 is not necessarily employed.

The controller 20 controls the servo controller 15, the signal processor 16, the memory controller 17, the data converter 19 and the salvage generator 21 in a recording and replay process. An allocation manager 31 in the controller 20 manages the recording position and replay position of data on the optical disk 11.

The salvage generator 21 generates the salvage marker containing a salvage ID and identification information for identifying a file, and supplies the memory controller 17 with the salvage marker.

In addition, the disk recording and replay apparatus 10 may include a disk loading/unloading motor for loading and unloading the optical disk 11, a display for displaying an operational status and a variety of guides relating to the operation of the disk recording and replay apparatus 10, and an operation panel for receiving operational inputs from a user, although these elements are not shown here.

A disk operating process, namely, a process with a disk loaded, of the disk recording and replay apparatus 10 is now described with reference to a flowchart of FIG. 4.

In step S1, the controller 20 waits on standby until an optical disk is loaded into the disk recording and replay apparatus 10. When an optical disk is loaded, the controller 20 proceeds to step S2 and performs a restoration execution determination process. The restoration execution determination processes performed on the disk that was loaded into the disk recording and replay apparatus 10 but ended with a recording interruption. The restoration execution determination process determines whether the restoration of data (the data recorded until the interruption of the recording process is registered as a file in the file system) is required. The process will be discussed later in detail with reference to a flowchart shown in FIG. 9.

In step S3, the controller 20 determines whether or not the restoration of the data is required by referring to the result of the restoration execution determination process in step S2. If it is determined that the restoration of the data is required, the controller 20 proceeds to step S4.

In step S4, the controller 20 causes the unshown display to display a guide to urge an operator to determine whether to perform the data restoration process (a salvage process). In step S5, the controller 20 determines whether an operational input as a command for the execution of the data restoration process is received from the unshown operation panel. If it is determined that the operation input as the command for the execution of the data restoration process is received, the controller 20 proceeds to step S6 and executes the data restoration process. The data restoration process will be discussed in detail later with reference to flowcharts of FIG. 10 and FIG. 16. Subsequent to the process in step S6, the algorithm proceeds to step S7.

If the controller 20 determines in step S3 that the restoration of data is not required, the process in step S4 through step S6 is skipped, and then the algorithm proceeds to step S7. If the controller 20 determines in step S5 that the operational input as the command for the execution of the data restoration process is not input from the operation panel (a command not to perform the data restoration process is input), the process in step S6 is skipped, and the algorithm proceeds to step S7.

In step S7, the controller 20 determines whether an operational input commanding the unloading of the optical disk 11 is received from the operation panel (not shown). If it is determined that the operational input commanding the unloading of the optical disk 11 is not input, the algorithm proceeds to step S8. In step S8, the controller 20 determines whether the unshown operation panel issues a command to record data. If it is determined that a command to record data is issued, the algorithm proceeds to step S9. The controller 20 performs a data recording process. The data recording process will be discussed more in detail later. Subsequent to the recording process in step S9, the algorithm loops to step S7 to repeat step S7 and subsequent steps.

If the controller 20 determines in step S8 that the command to record data is not issued from the operation panel (not shown), the algorithm proceeds to step S10.

In step S10, the controller 20 determines whether a command to perform another process (other than the loading process of the optical disk 11 and the data recording process) is issued from the operation panel (not shown). If it is determined that a command for another process is issued, the algorithm proceeds to step S11. The controller 20 controls the blocks in the disk recording and replay apparatus 10, thereby performing the requested processes. The other process includes a replay process for replaying a file (AV data) recorded on the optical disk 11, for example. Subsequent to the process in step S11, the algorithm loops to step S7 to repeat step S7 and subsequent steps.

If the controller 20 determines in step S10 that any command for another process is not issued from the operation panel (not shown), the algorithm loops to step S7 to repeat step S7 and subsequent steps.

If the controller 20 determines in step S7 that the operation panel (not shown) has issued a command to unload the optical disk 11, the algorithm proceeds to step S12. The controller 20 drives the disk loading/unloading motor (not shown), thereby unloading the optical disk 11 out of the disk recording and replay apparatus 10.

The disk recording and replay apparatus 10 thus completes the disk operating process. It may be determined that the command not to restore data is input, and the restoration process may not be performed in step S6. In such a case, when the recording process is performed in step S9, new data overwrites unrestored data (the data that is not registered as a file in the file system). The unrestored data is thus deleted from the optical disk 11 sooner or later.

In the above-referenced disk operating process, the process in step S2 and subsequent steps is executed when the optical disk 11 is loaded in the disk recording and replay apparatus 10 in step S1. This process is one example only. The process in step S2 and subsequent steps may be performed if the disk recording and replay apparatus 10 is switched off with the optical disk 11 loaded and the disk recording and replay apparatus 10 is switched on again later. For example, if a command to execute the restoration execution determination process is input by a user with the optical disk 11 loaded, the restoration execution determination process may be performed. In such a case, the process in step S3 and subsequent steps may further be performed subsequent to the execution of the restoration execution determination process. If the restoration execution determination process is executed (step S2), and it is determined that the data has to be restored (YES in step S3), the controller 20 may proceed to step S6 subsequent to skipping steps S4 and S5 (in other words, if the restoration of data is required, the determination of whether or not to restore the data is automatically performed rather than being left to the user's decision).

The recording process illustrated in FIG. 4 will now be discussed in detail with reference to a flowchart in FIG. 6. Before the discussion of the recording process, an example of information contained in the salvage marker is discussed with reference to FIG. 5. FIG. 5 is a chart illustrating an example of recording order of data to be recorded onto the optical disk 11. FIG. 5 shows part of the recording area of the optical disk 11. Arranged from left as shown in FIG. 5 are "SA1", "audio 1", "video 1", "SA2", "audio 2", "video 2", "SA3", "audio 3", and "video 3". "SA1" represents a salvage marker 1, "audio 1" represents audio data 1, video 1 represents video data 1, "SA2" represents a salvage marker 2, "audio 2" represents audio data 2, "video 2" represents video data 2, "SA3" represents a salvage marker 3, "audio 3" represents audio data 3, and "video 3" represents video data 3.

Recording areas of the video data 1, the video data 2 and the video data 3 are represented by hatched areas. The recording area of the video data 2 contains a "defect" in the middle of recording. This means that data is not recorded there in the recording area for some reasons.

Segment data such as the audio data 1 through the audio data 3, and the video data 1 through the video data 3, forming a single file, are referred to as segment files.

The salvage marker 1 contains information relating to the audio data 1 and the video data 1. The salvage marker 2 contains information relating to the audio data 2 and the video data 2. The salvage marker 3 contains information relating to the audio data 3 and the video data 3. The disk recording and replay apparatus 10 generates a salvage marker for the audio data and the video data on a per recording unit basis, wherein the unit is a predetermined length (an amount of data). The disk recording and replay apparatus 10 then records the salvage marker onto the optical disk 11 on a per recording unit basis. In the discussion that follows, the recording unit is referred to as a segment. As shown in FIG. 5, the audio data 1 and the video data 1 form a single segment, the audio data 2 and the video data 2 form a single segment, and the audio data 3 and the video data 3 form a single segment.

As shown in FIG. 5, a "data location (planned)" pointed by an arrow-headed broken line extending from the salvage marker 1 is a single piece of information to be recorded in the salvage marker 1. Recorded in the salvage marker 1 are the type of data (the audio data 1 and the video data in FIG. 5, and may be occasionally a file name) to be recorded subsequent to the salvage marker 1 and information relating to a recording area (the recording area of the audio data 1 and the recording area of the video data 1 as shown in FIG. 5). The "recording area" is represented by a physical address at the position of a border of data (for example, the audio data 1 and the video data 1). More specifically, the recording area is represented by a physical address of a recording start position of the audio data 1 (the physical recording position on the optical disk 11), a physical address of a recording end position of the audio data 1, and a physical address of a recording end position of the video data 1. The recording end position of the audio data 1 coincides with the recording start position of the video data 1. This information allows the physical recording positions of the audio data 1 and the video data 1 on the optical disk 11 to be individually identified. The present invention is not limited to this method. Alternatively, the recording area may be represented by the physical address of the recording start position and the length of recording.

A "pointer (planned)" indicated by an arrow-headed broken line in FIG. 5 represents one piece of information to be recorded in the salvage marker 1. More specifically, information relating to a planned recording position of a salvage marker to be recorded on the optical disk 11 subsequent to the salvage marker 1, namely, a salvage marker 2, is recorded in the salvage marker 1.

In the discussion that follows, the type of data to be recorded subsequent to the salvage marker and information relating to the recording area are referred to as data location information. The data location information tells what type of data is recorded in succession to the salvage marker and at what position the data is recorded on the optical disk 11. In the discussion that follows, information relating to the planned recording position of another salvage marker to be recorded onto the optical disk 11 subsequent to a first salvage marker is referred to as pointer information. When a salvage marker is found, the pointer information recorded in the salvage marker identifies the location of a salvage marker to be recorded subsequent to the first salvage marker on the optical disk 11.

In addition to the data location information and the pointer information, the salvage marker 1 may contain at least one of a salvage ID, recording time information of data, identification information for identifying a file, a recording order ID indicating the recording order of the salvage marker, and mapping information for mapping the audio data 1 and the video data 1 with a time code.

The salvage marker 2 may contain at least one of the salvage ID, the data location information of the audio data 2 and the video data 2, the pointer information indicating the planned recording position of the salvage marker 3, the recording time information of the data, the identification information for identifying the file, the recording order ID indicating the recording order of the salvage marker, and the mapping information for mapping the audio data 2 and the video data 2 with the time code.

The salvage marker 3 may contain at least one of the salvage ID, the data location information of the audio data 3 and the video data 3, the pointer information indicating the planned recording position of a salvage marker 4 (not shown), the recording time information of the data, the identification for identifying the file, the recording order ID indicating the recording order of the salvage marker, and the mapping information for mapping the audio data 3 and the video data 3 with the time code.

As shown in FIG. 5, the salvage marker contains information relating to data recorded between the salvage marker and the salvage marker to be recorded next (including the pointer information of the salvage marker to be recorded next).

Time information, if contained in the salvage marker, prevents data contained in another file deleted in the past from being erroneously output.

The process in step S9 of FIG. 4, namely, the recording process of the disk recording and replay apparatus, is described in detail with reference to a flowchart of FIG. 6.

Figure 6:
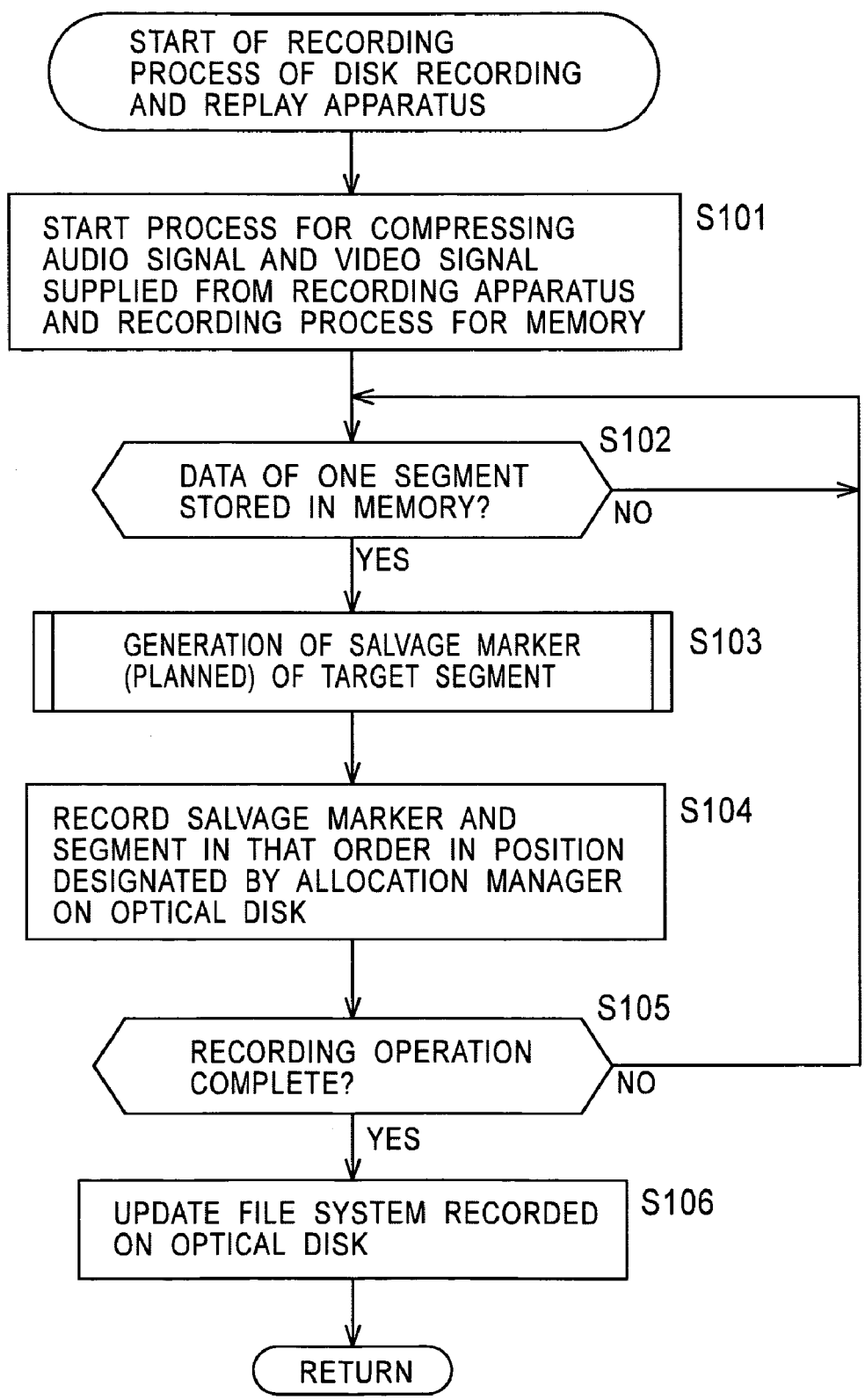
FIG. 6 is a flowchart illustrating in detail a process in step S9 of FIG. 4.

In step S101 in FIG. 6, the controller 20 controls the data converter 19, thereby starting a compression process for compressing an audio signal and a video signal supplied from the signal input/output device 41 to the disk recording and replay apparatus 10. The controller 20 also controls the memory controller 17, thereby starting a storage process for storing, in the memory 18, the audio data and the video data provided as a result of the compression process of the data converter 19.

In step S102, the controller 20 monitors the memory 18 through the memory controller 17, thereby determining whether one segment of audio data and video data is stored in the memory 18. The controller 20 waits on standby until it is determined that one segment of audio data and video data is stored in the memory 18. When the one segment of audio data and video data is stored in the memory 18, the algorithm proceeds to step S103.

In step S103, the controller 20 causes the salvage generator 21 to generate a salvage marker corresponding to the audio data and the video data stored in the memory 18. Referring to a flowchart of FIG. 7, a generation process of a salvage marker (planned) of the salvage generator 21 is described in detail. The word "(planned)" of the salvage marker (planned) means that the planned location of the data to be recorded now is recorded as the data location information, and that the planned recording position of a next salvage marker is recorded as the pointer information.

The salvage generator 21 contains an internal clock, and in step S151, the salvage generator 21 acquires current time at that moment (may contain date information) as the recording time information. The recording time information is used in the process in step S205 to be discussed later with reference to FIG. 9. In step S152, the controller 20 generates the identification information of the file. The salvage generator 21 generates the same identification information from the start to the end of the recording process. The salvage generator 21 generates different identification information when another recording process is initiated after the completion of the first recording process. In this way, when no series of data recorded onto the optical disk 11 is found after the start of the recording process, the controller 20 determines that there is no data belonging to the same file (a segment of another file is distinguished).

In step S153, the salvage generator 21 generates the recording order ID indicating the recording order of the salvage marker. The salvage generator 21 generates "1" as the recording order ID for a salvage marker that is generated first from the start of the recording process, generates "2" for a salvage marker that is generated second from the start of the recording process, generates "3" for a salvage marker that is generated third from the start of the recording process, and further generates the recording order IDs that are successively incremented by one until the recording process ends. If the recording order ID is not recorded in the salvage marker, a subsequent segment can be erroneously detected as a result of failure to read the audio data and the video data contained in one segment (or a plurality of segments), although that possibility is low. With the recording order ID recorded in the salvage marker, the recording order of the audio data and the video data is identified based on the recording order of the salvage markers when the data restoration process is executed later.

In step S154, subsequent to step S153, the salvage generator 21 acquires the mapping information of the file and the time code. The time code is supplied to the salvage generator 21 from the signal input/output device 41 through the data converter 19 and the controller 20. The time code acquired by the salvage generator 21 is the one corresponding to the audio data and the video data stored in the memory 18. The mapping information of the file and the time code is additional information that is required to heighten indexing accuracy in the replaying of the AV data. The mapping information is typically recorded at a time at the end of the recording process. If the salvage marker contains no mapping information of the file and the time code, all AV data to be restored must be read from the optical disk 11 to generate the mapping information from scratch. It takes a long time to restore the mapping information of the file and the time code. If the restoration of the mapping information of the file and the time code is dropped to shorten process time, there is a possibility that the indexing accuracy is adversely affected later during the replaying of data.

With the mapping information of the file and the time code contained in the salvage marker, the restoration of the mapping information of the file and the time code involving long time is eliminated during the data restoration process.

In step S155, subsequent to the process in step S154, the salvage generator 21 acquires the data location information of the audio data and the video data stored in the memory 18, from the allocation manager 31 in the controller 20.

In step S156, subsequent to the process in step S155, the salvage generator 21 acquires the pointer information of a next salvage marker from the allocation manager 31 in the controller 20.

After the process in step S156, the algorithm proceeds to step S157. The salvage generator 21 generates the salvage marker containing the preset salvage ID, the recording time information acquired in step S151, the identification information of the file generated in step S152, the recording order ID generated in step S153, the mapping information of the file and the time code acquired in step S154, the data location information acquired in step S155 and the pointer information acquired in step S156.

Figure 8:
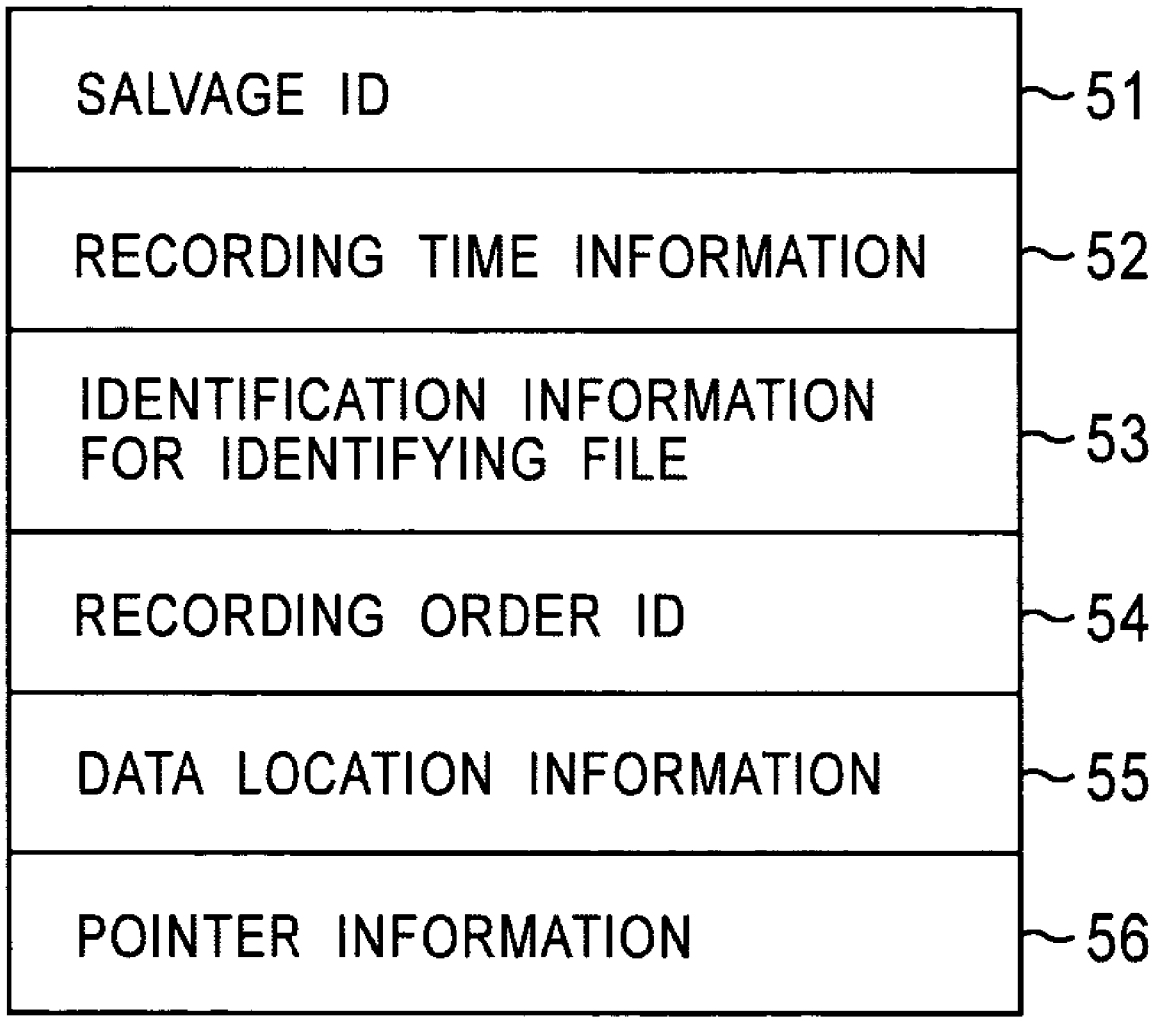
FIG. 8 illustrates an example of the salvage marker.

FIG. 8 illustrates an example of the generated salvage marker. The salvage marker shown in FIG. 8 contains a salvage ID 51, recording time information 52, identification information 53 for identifying the file (such as a file name), a recording order ID 54, data location information 55, and pointer information 56. In addition, the salvage marker may contain mapping information of the file and the time code, although not shown in FIG. 8.

The salvage ID 51 contained in the salvage marker allows the disk recording and replay apparatus to detect the salvage marker later during a data restoration process.

The recording time information 52 contained in the salvage marker allows the disk recording and replay apparatus to prevent data belonging to a file deleted from the optical disk 11 in the past (deleted from the file system) from erroneously being restored later during a data restoration process.

With the salvage marker containing the identification information 53 for identifying the file, the disk recording and replay apparatus identifies the file, to which the data identified by the salvage marker belongs, later during a data restoration process. For example, if the same identification information is recorded in the salvage marker 1, the salvage marker 2 and the salvage marker 3 shown in FIG. 5, the disk recording and replay apparatus identifies the audio 1 through the audio 3 and the video 1 through the video 3 as being data belonging to the same file during the data restoration process.

With the recording order ID 54 contained in the salvage marker, the disk recording and replay apparatus can learn a failure to read a salvage marker if the apparatus erroneously skips the salvage marker during the data restoration process. For example, now, the recording order ID of the salvage marker 1 is "1", the recording order ID of the salvage marker 2 is "2", and the recording order ID of the salvage marker 3 is "3" in FIG. 5. If the disk recording and replay apparatus fails to detect the salvage marker 2 subsequent to a successful detection of the salvage marker 1 and then detects the salvage marker 3, the disk recording and replay apparatus detects the recording order ID "3" of the salvage marker 3 subsequent to the detection of the recording order ID "1" of the salvage marker 1. In this way, the disk recording and replay apparatus detects the missing of the recording order ID "2", thereby finding the missing salvage marker 2.

With the data location information 55 contained in the salvage marker, the disk recording and replay apparatus identifies the physical recording position (physical address) of the data identified by the salvage marker on the optical disk 11 based on the data location information 55 during the data restoration process.

With the pointer information 56 contained in the salvage marker, the disk recording and replay apparatus identifies the physical recording position (physical address) of a next marker (the salvage marker 2 in FIG. 5, for example) on the optical disk 11 based on the pointer information during the data restoration process subsequent to identifying one marker (the salvage marker 1 in FIG. 5, for example).

These pieces of information, contained in the salvage marker and used to restore data, are also referred to as salvage processing information.

Subsequent to the generation process of the salvage marker (planned) of the disk recording and replay apparatus 10, the algorithm proceeds to step S104 in FIG. 6.

In step S104, the controller 20 controls the memory controller 17 and the salvage generator 21, thereby supplying the signal processor 16 with the salvage marker generated in step S103, and the one segment of audio data and video data determined to be stored in the memory 18 in step S102, in the order of the salvage marker, the audio data and the video data. More specifically, the salvage generator 21 supplies the signal processor 16 with the generated salvage marker. The memory controller 17 supplies the signal processor 16 with the one segment of audio data and video data from the memory in that order.

The salvage marker, the audio data and the video data supplied to the signal processor 16 are modulated into recording signals in that order, and the modulated signals are fed to the pickup unit 13 to be recorded onto the optical disk 11.

In step S105, subsequent to the process in step S104, the controller 20 determines whether the recording process is complete by determining whether new audio data and new video data are stored in the memory 18. If it is determined that new audio data and new video data are stored in the memory 18, in other words, if it is determined that the recording process is not yet complete, the algorithm loops to step S102 to repeat step S102 and subsequent steps.

If the controller 20 determines in step S105 that new audio data and new video data are not stored in the memory 18, in other words, the controller 20 determines that the recording process has to end, the algorithm proceeds to step S106.

In step S106, the controller 20 produces a file system corresponding to the data (file) recorded on the optical disk 11 in the process in steps S101 through S105, and supplies the signal processor 16 with the file system, thereby updating the file system recorded on the optical disk 11.

The recording process of the disk recording and replay apparatus 10 is now complete.

The process in step S2 shown in FIG. 4, namely, the restoration execution determination process of the disk recording and replay apparatus 10 will now be discussed in detail with reference to a flowchart of FIG. 9.

Figure 9:
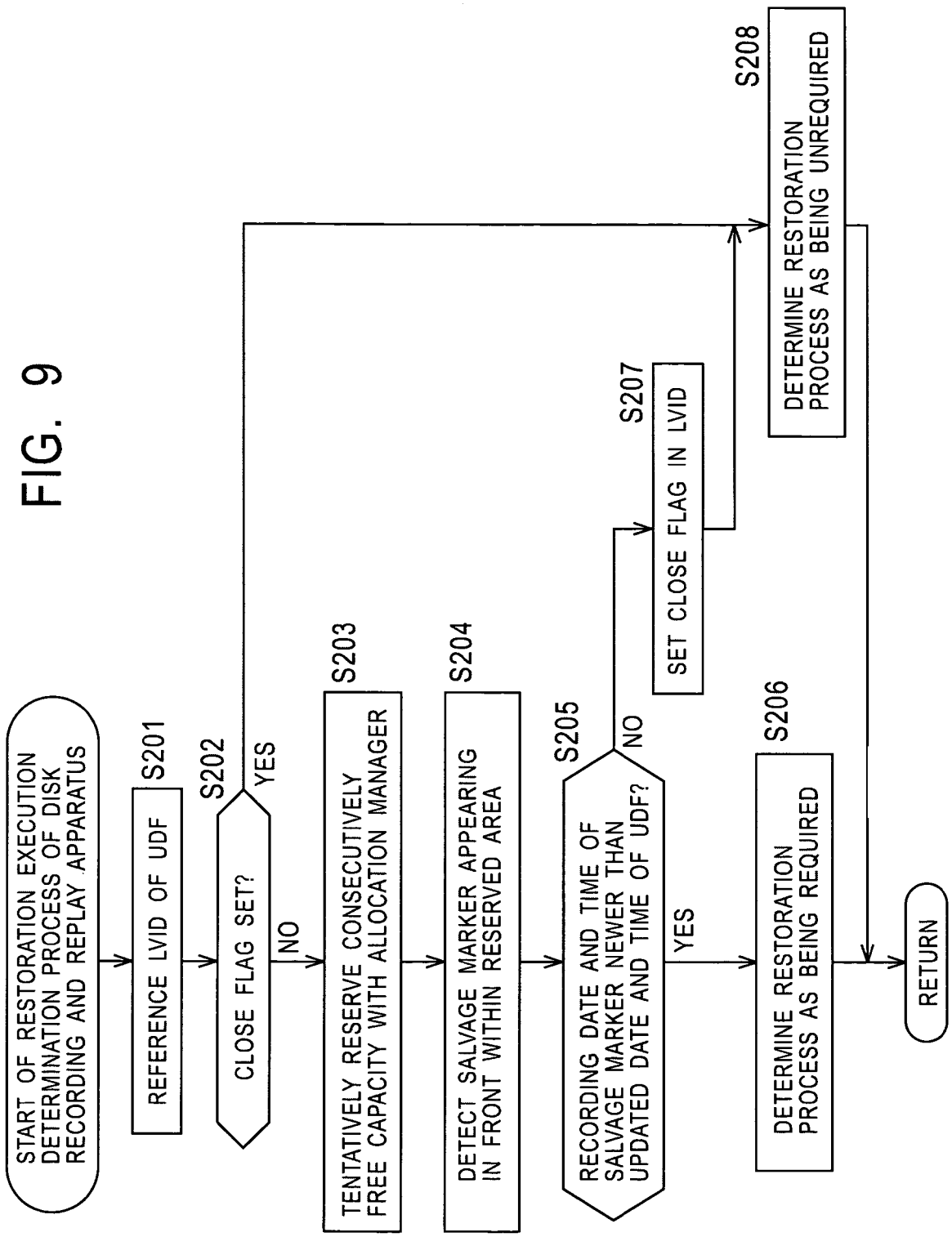
FIG. 9 is a flowchart illustrating in detail a process in step S2 of FIG. 4.

In step S201 in FIG. 9, the controller 20 controls the servo controller 15, thereby acquiring a UDF (Universal Disk Format) as a file system from the optical disk 11, and referencing LVID (Logical Volume Integrity Descriptor) of the acquired UDF. The LVID is a flag indicating whether a file recorded on the optical disk 11 is closed in the normal state thereof. If the file system corresponding to the data recorded on the optical disk 11 is normally recorded, a close flag is set in the LVID.

If the file system corresponding to the data recorded on the optical disk 11 is not normally recorded, an open flag is set in the LVID.

In step S202, the controller 20 determines whether the close flag referenced in step S201 is set in the LVID. If it is determined that the close flag is not set, the algorithm proceeds to step S203.

The file name corresponding to the data recorded on the optical disk 11, the recording position of the data on the optical disk 11, etc. are recorded in the file system. For example, if the recording process is interrupted due to a power failure, information such as the recording position of the data being recorded on the optical disk 11 and the file name corresponding to the data being recorded on the optical disk 11 is not registered in the file system. The recording area where the data is recorded until the recording interruption is registered as a free space having no data recorded in the file system.

In step S203, the controller 20 tentatively reserves a consecutively free space with the allocation manager 31. Based on the information relating to the recording position of the data registered in the file system, the allocation manager 31 identifies a free space having no data recorded therein from among recording areas on the optical disk 11, and determines a recording order according to which the data is to be recorded, in other words, with which free space and at what position of the free space the data recording starts, when the data is tentatively recorded on the identified free spaces. In step S204, the controller 20 controls the servo controller 15, thereby searching for a salvage ID within the free space reserved in step S203. In this search, the controller 20 starts with recording areas, reserved in step S203, in the order with which data is recorded. In this way, the salvage IDs are efficiently detected.

If a salvage ID is found in step S204, the controller 20 reads the salvage marker containing the salvage ID, and determines in step S205 whether recording time information (time acquired in step S151 in FIG. 7, for example) contained in the salvage marker is newer than the update date of the UDF. If the controller 20 determines that the recording time information contained in the salvage marker is newer than the update date of the UDF, the algorithm proceeds to step S206. The controller 20 determines that the restoration process is required. The algorithm proceeds to step S3 in FIG. 4.

If the controller 20 determines in step S202 that a close flag is set in the LVID referenced in step S201, the algorithm proceeds to step S208.

If the controller 20 determines in step S205 that the recording time information contained in the salvage marker is older than the update date of the UDF, the algorithm proceeds to step S207. In step S207, the controller 20 controls the servo controller 15 and the signal processor 16, thereby setting a close flag in the LVID of the UDF recorded in the optical disk 11. Then, the algorithm proceeds to step S208.

In step S208, the controller 20 determines that no restoration process is required. Then, the algorithm proceeds to step S3 of FIG. 4.

The restoration execution determination process of the disk recording and replay apparatus 10 is performed in this way.

The execution of the process in step S205 prevents the data of a file deleted from the optical disk 11 in the past from being erroneously restored.

The process in step S6 shown in FIG. 4, namely, the data restoration process of the disk recording and replay apparatus 10 will be discussed in detail with reference to a flowchart of FIG. 10.

Figure 10:
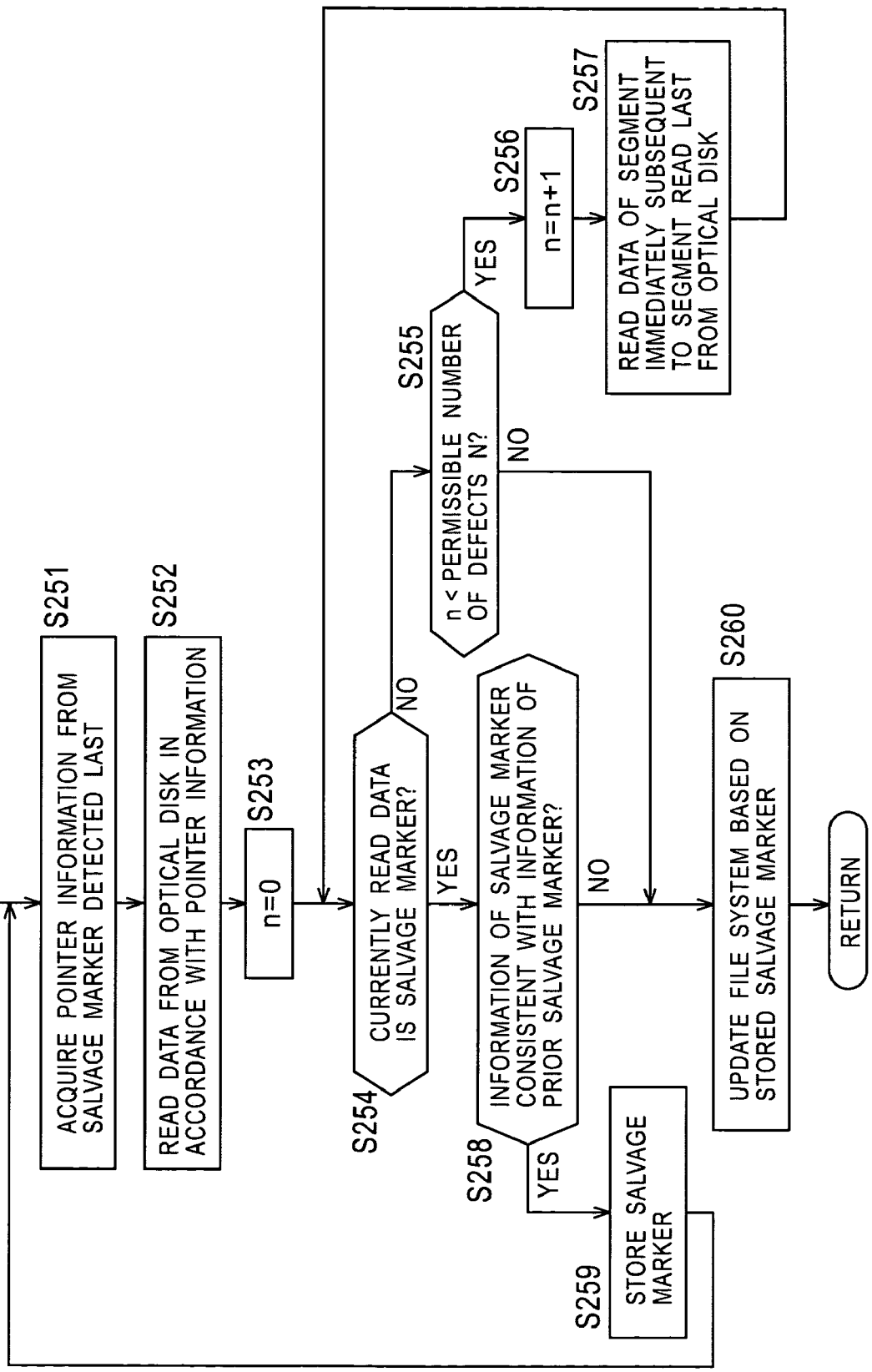
FIG. 10 is a flowchart illustrating in detail a process in step S6 of FIG. 4.

In step S251 shown in FIG. 10, the controller 20 acquires the pointer information contained in the salvage marker detected last. In the beginning of the restoration process of FIG. 10, the controller 20 acquires the pointer information contained in the salvage marker detected in step S204 of FIG. 9.

In step S252, the controller 20 controls the servo controller 15 based on the pointer information acquired in step S251, thereby reading the data at the recording position where a next salvage marker is recorded.

In step S253, the controller 20 initializes a variable "n" to zero, wherein the variable "n" is incremented one by one in the process in step S256 to be discussed later. In step S254, the controller 20 determines, based on the presence or absence of the salvage ID, whether the data read in step S252 is a salvage marker. If it is determined in step S252 that the read data is not a salvage marker (if no salvage ID is detected), the algorithm proceeds to step S255.

In step S255, the controller 20 determines whether the variable "n" is smaller than a predetermined permissible number "N" of defects. If it is determined that the variable "n" is smaller than the predetermined permissible number "N" of defects, the algorithm proceeds to step S256 to increment the variable "n" by one. In step S257, the controller 20 controls the servo controller 15, thereby reading data of a segment that is located immediately subsequent to a segment read last from the optical disk 11. The controller 20 loops to step S254 to repeat step S254 and subsequent steps. In step S254, the controller 20 determines whether the data read in step S257 from the optical disk 11 is a salvage marker.

Returning to step S255, if the controller 20 determines whether the variable "n" is equal to or larger than the predetermined permissible number "N" of defects, the algorithm proceeds to step S260.

When data is recorded onto the optical disk 11, an area where data fails to be recorded for some reasons as indicated as a "defect" in the video data 2 as illustrated in FIG. 5. In such a case, the pointer information recorded beforehand in the salvage marker fails to coincide with the position where the next salvage marker is actually recorded. For example, as shown in FIG. 5, the salvage marker 3 is shifted more rightward than the location indicated by an arrow of the pointer information (planned) contained in the salvage marker 2. The process in steps S254 through S257 is repeated as already discussed to search for the salvage marker within a range that also contains a subsequent predetermined area (segment) later than the pointer information (the planned recording position of the next salvage marker) acquired in step S251. Even if the planned recording position of the next salvage marker fails to coincide with the actual recording position, the salvage marker is detected with a high probability.

If the controller 20 determines that the data read in step S252 (or step S257) is the salvage marker (if it is determined that the salvage ID is contained in the read data), the algorithm proceeds to step S258.

In step S258, the controller 20 determines whether information contained in the read salvage marker is consistent with information contained in the salvage marker read before. The process in step S258 will now be discussed more specifically.

Here, it is assumed that the salvage marker contains the recording time information, the identification information for identifying the file, and the recording order ID. In a series of recording processes, the salvage markers recorded on the optical disk 11 have the same identification information for identifying the file. As already discussed with reference to the process in step S153 of FIG. 7, the recording order ID complies with a predetermined rule among salvage markers consecutive in the recording order (for example, a rule that the recording order ID is incremented one by one). In step S258, the controller 20 determines whether the identification information of the file contained in the salvage marker read in step S252 (or step S257) matches the identification information of the file contained in the immediately prior read salvage marker. If it is determined that the two pieces of identification information fail to match, the controller 20 determines that the salvage marker read in step S252 (or in step S257) is not consistent with the immediately prior read salvage marker.

If it is determined that the identification information of the file contained in the salvage marker read in step S252 (or step S257) matches the identification information of the file contained in the immediately prior read salvage marker, the controller 20 determines whether the recording order ID contained in the salvage marker read in step S252 (or step S257) and the recording order ID contained in the immediately prior read salvage marker are IDs complying with a predetermined rule (a rule of incrementing one by one). If it is determined that the recording order IDs are not the IDs complying with the predetermined rule, the controller 20 determines that the salvage marker read in step S252 (or step S257) fails to be consistent with the immediately prior read salvage marker.

If it is determined that the recording order ID contained in the salvage marker read in step S252 (or step S257) and the recording order ID contained in the immediately prior read salvage marker are the IDs complying with the predetermined rule, the controller 20 determines that the salvage marker read in step S252 (or step S257) is consistent with the immediately prior read salvage marker.

In this way, the controller 20 determines in step S258 whether the salvage marker read in step S252 (or step S257) is consistent with the immediately prior read salvage marker. If it is determined in step S258 that the salvage marker read in step S252 (or step S257) is consistent with the immediately prior read salvage marker, the algorithm proceeds to step S259.

In step S259, the controller 20 supplies the memory controller 17 with the salvage marker read in step S252 (or step S257) from the optical disk 11, thereby causing the memory 18 to store the salvage marker. The, the algorithm loops to step S251 to repeat step S251 and subsequent steps. In step S251 executed subsequent to step S259, the controller 20 acquires the pointer information from the salvage marker stored in the memory 18 in step S259.

If the controller 20 determines in step S258 that the salvage marker read in step S252 (or step S257) is not consistent with the immediately prior read salvage marker, the algorithm proceeds to step S260.

Based on the salvage marker stored in the memory 18 in step S259, the controller 20 registers in step S260 the audio data and the video data, which have failed to be filed due to an interruption in the middle of recording, as a file in the file system of the optical disk 11 through the signal processor 16, the pickup unit 13, etc. In other words, the controller 20 extracts the data location information from the salvage marker stored in the memory 18. As already discussed, the data location information contains information of the type of data (the audio data and the video data) identified by each salvage marker and information of the recording position (physical address) of the data on the optical disk 11. Based on the data location information, the controller 20 registers the file in the file system with the physical recording position of the audio data and the video data contained in the file mapped with the file.

Figure 11:
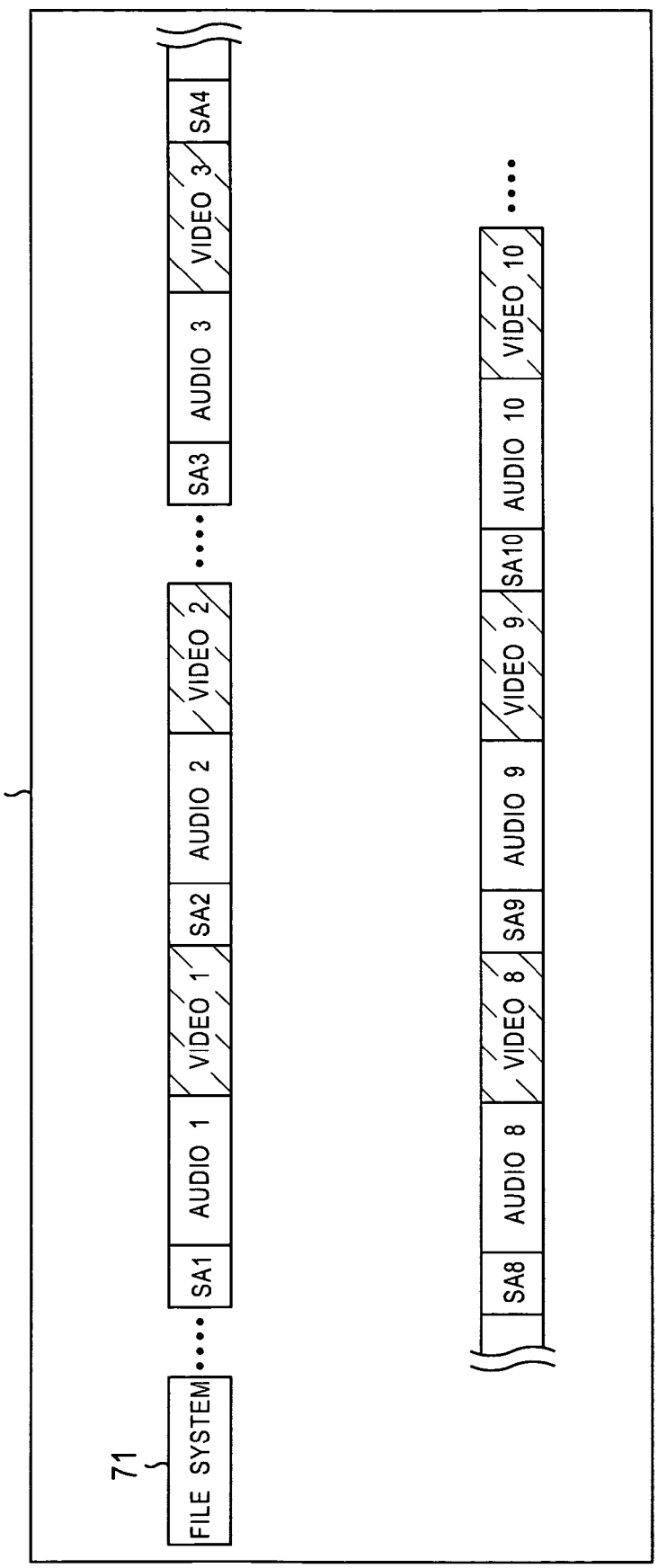
FIG. 11 illustrates an example of data recorded on an optical disk.

FIG. 11 illustrates an example of data recorded on the optical disk 11. As shown, a file system 71 is recorded on an inner circle of the optical disk 11 while the audio data, the video data and the salvage marker are recorded on a circle more outer than the file system 71. As shown, one new file containing, as data, audio 1 through audio 10 and video 1 through video 10 is registered in the file system 71 shown in FIG. 11 in the process of step S260.

By registering the data as one new file in the file system 71, the audio data and the video data, which have failed to normally end and have been unable to be read, are now read.

The data restoration process of the disk recording and replay apparatus 10 has been discussed.

If the pointer information is not contained in the salvage marker, the recording position of the next salvage marker, which is otherwise predicted in the process in step S251 and step S252, cannot be predicted. As a result, the salvage IDs must be successively searched on the track of the optical disk 11. A long period of time is required prior to the detection of the salvage marker. With the pointer information contained in the salvage marker, an approximate recording position of the next salvage marker is predicted. The salvage markers are quickly detected.

If no pointer information is contained in the salvage marker, the salvage IDs may be successively detected on the track of the optical disk 11.

Figure 12:
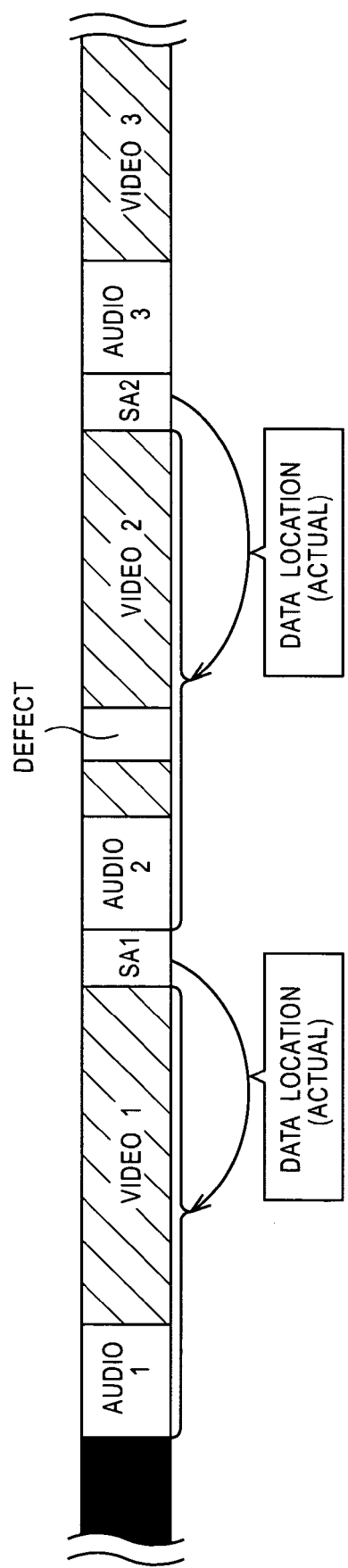
FIG. 12 is a chart illustrating another example of information contained in the salvage marker.

In the above discussion, the salvage marker is recorded immediately prior to the corresponding segment. Alternatively, the salvage marker may be recorded immediately subsequent to the corresponding segment. FIG. 12 shows data arranged in such a recording order.

FIG. 12 shows part of the recording areas of the optical disk 11. Arranged in order from left as shown in FIG. 12 are "audio 1", "video 1", "SA1", "audio 2", "video 2", "SA2", "audio 3", and "video 3". "Audio 1" represents audio data 1, "video 1" represents video data 1, "SA1" represents a salvage marker 1, "audio 2" represents audio data 2, "video 2" represents video data 2, "SA2" represents a salvage marker 2, "audio 3" represents audio data 3, and "video 3" represents video data 3.

Recording areas of the video data 1, the video data 2 and the video data 3 are represented by hatched areas. The recording area of the video data 2 contains a "defect" in the middle of recording. This means that data is not recorded there in the recording area for some reasons.

The salvage marker 1 contains information relating to the audio data 1 and the video data 1. The salvage marker 2 contains information relating to the audio data 2 and the video data 2. The salvage marker 3 (not shown) contains information relating to the audio data 3 and the video data 3. Unlike in FIG. 5, the salvage marker is recorded immediately subsequent to the corresponding segment in FIG. 12.

As shown in FIG. 12, a "data location (actual)" pointed by an arrow-headed solid line extending from the salvage marker 1 is a single piece of information to be recorded in the salvage marker 1. Recorded in the salvage marker 1 are the type of data (the audio data 1 and the video data 1 in FIG. 12) recorded prior to the salvage marker 1 and information relating to a recording area (the recording area of the audio data 1 and the recording area of the video data 1 as shown in FIG. 12). The "recording area" is represented by a physical address at the position of a border of data (for example, the audio data 1 and the video data 1). More specifically, the recording area is represented by a physical address of a recording start position of the audio data 1 (the physical recording position on the optical disk 11), a physical address of a recording end position of the audio data 1, and a physical address of a recording end position of the video data 1. The recording end position of the audio data 1 coincides with the recording start position of the video data 1.

In the above discussion, the type of data and the information relating to the recording area, recorded subsequent to the salvage marker, are referred to as the data location information. However, in the discussion that follows, the type of data and the information relating to the recording area, recorded prior to the salvage marker, are also referred to as the data location information.

The pointer information is recorded in the salvage marker as shown in FIG. 5, while no pointer information is recorded in the salvage marker as shown in FIG. 12.

In addition to the data location information, the salvage marker 1 may contain at least one of a salvage ID, recording time information of data, identification information for identifying a file, a recording order ID indicating the recording order of the salvage marker, mapping information for mapping the audio data 1 and the video data 1 with a time code, and defect position information of a defect caused at the recording of segments on the optical disk 11.

As shown in FIG. 12, information relating to data recorded between one salvage marker and another immediately prior recorded salvage marker is recorded in the one salvage marker.

Figure 4:
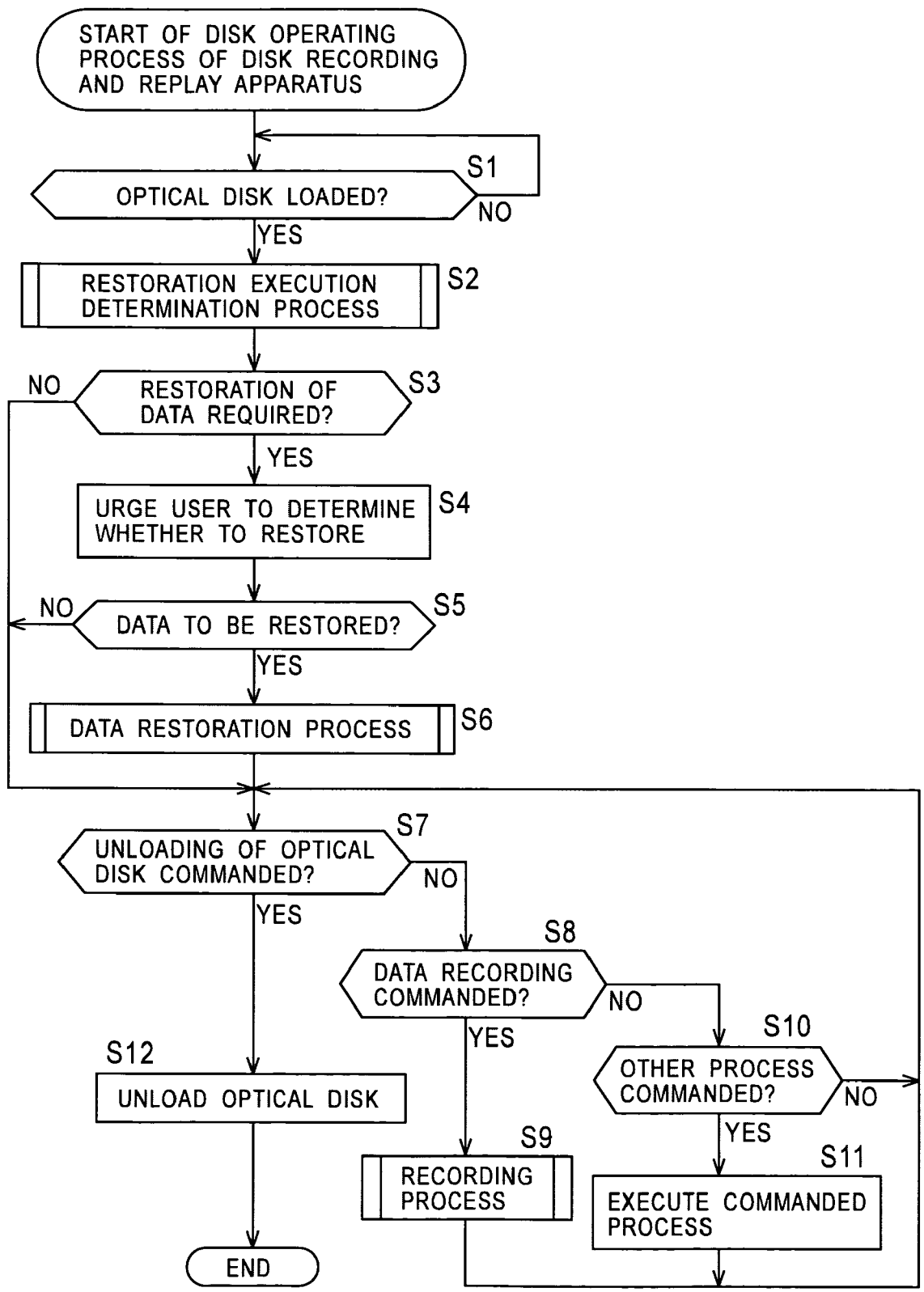
FIG. 4 is a flowchart illustrating a disk operating process of the disk recording and replay apparatus.
Figure 5:
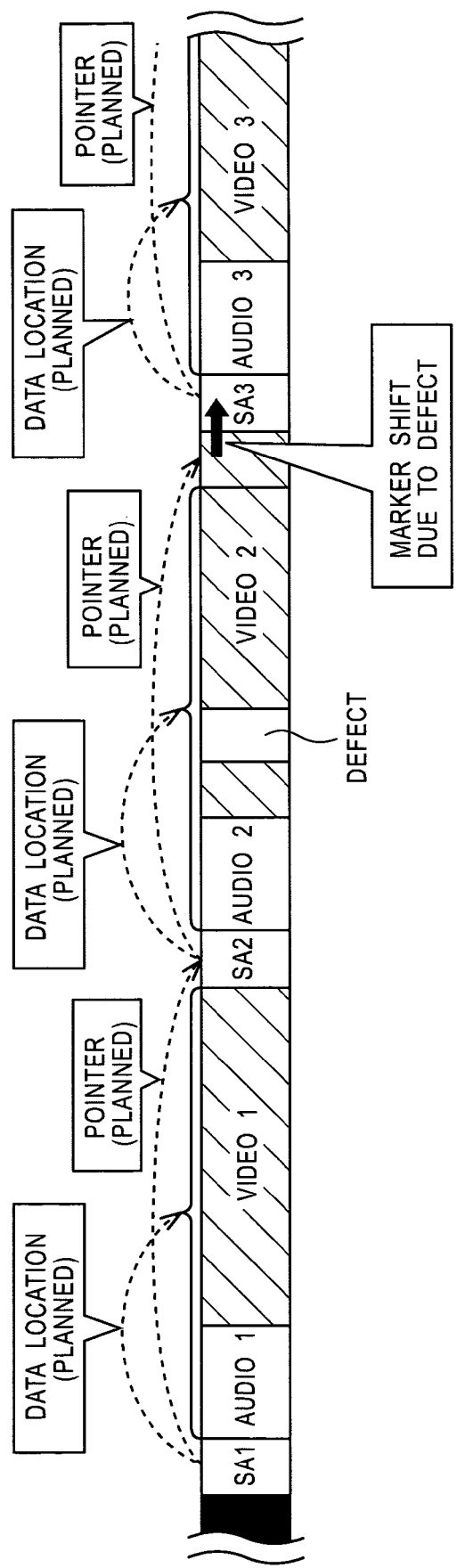
FIG. 5 is a chart illustrating an example of information contained in a salvage marker.
Figure 13:
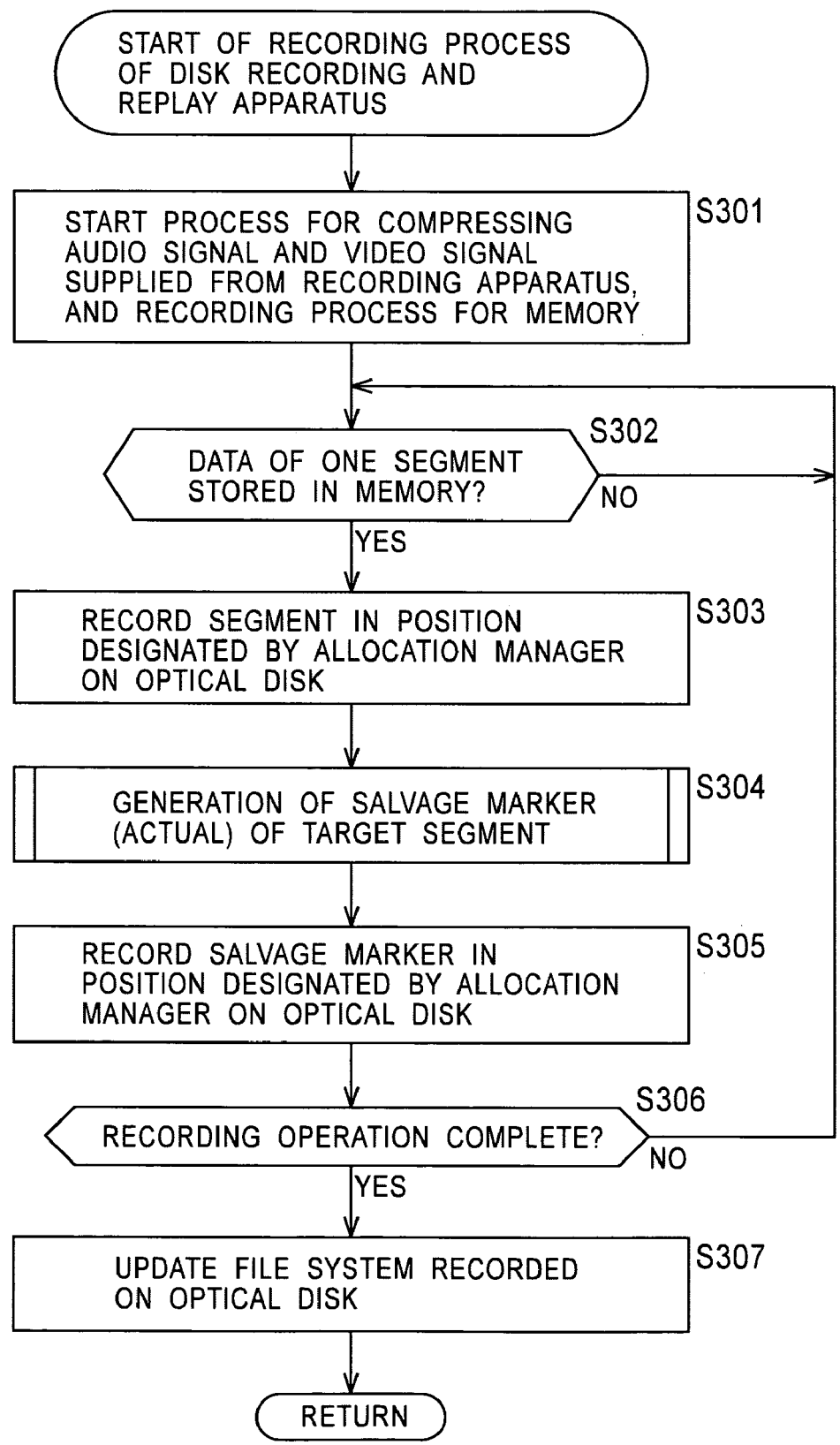
FIG. 13 is another flowchart illustrating in detail a process in step S9 of FIG. 4.

When the salvage marker is recorded immediately subsequent to the segment as shown in FIG. 12, the recording process in step S9 of FIG. 4 is represented in a flowchart of FIG. 13 rather than of FIG. 6. The recording process for recording a salvage marker immediately subsequent to the segment as shown in FIG. 12 is discussed with reference to a flowchart of FIG. 13.

In step S301 in FIG. 13, the controller 20 controls the data converter 19, thereby starting a compression process for compressing an audio signal and a video signal supplied from the signal input/output device 41 to the disk recording and replay apparatus 10. The controller 20 also controls the memory controller 17, thereby starting a storage process for storing, in the memory 18, audio data and video data provided as a result of the compression process of the data converter 19.

In step S302, the controller 20 monitors the memory 18 through the memory controller 17, thereby determining whether one segment of audio data and video data is stored in the memory 18. The controller 20 waits on standby until it is determined that one segment of audio data and video data is stored in the memory 18. When the one segment of audio data and video data is stored in the memory 18, the algorithm proceeds to step S303.

In step S303, the controller 20 controls the memory controller 17, thereby supplying the signal processor 16 with the one segment of audio data and video data determined to be stored in the memory 18 in step S102 in the order of the audio data and the video data. The audio data and the video data supplied to the signal processor 16 are modulated into recording signals in that order, and the modulated signals are fed to the pickup unit 13 to be recorded onto the optical disk 11. The allocation manager 31 acquires the results of the recording position of the audio data and the video data on the optical disk 11. If a defect takes place during the recording of the audio data and the video data, the allocation manager 31 also acquires information of the position of the defect on the optical disk 11 (also referred to as defect position information in the discussion that follows).

In step S304 subsequent to the process in step S303, the controller 20 causes the salvage generator 21 to generate a salvage marker corresponding to the audio data and the video data recorded on the optical disk 11 in step S303. The process in step S304 of FIG. 13, namely, the salvage marker (actual) generation process of the salvage generator 21 will now be discussed in detail with reference to a flowchart of FIG. 14.

The process in step S351 through step S354 is identical to that in step S151 through step S154. The process in step S351 through step S354 is thus only briefly described here.

The word "(actual)" of the salvage marker (actual) means that the result of the location of the already recorded data is recorded as the data location information.

Figure 14:
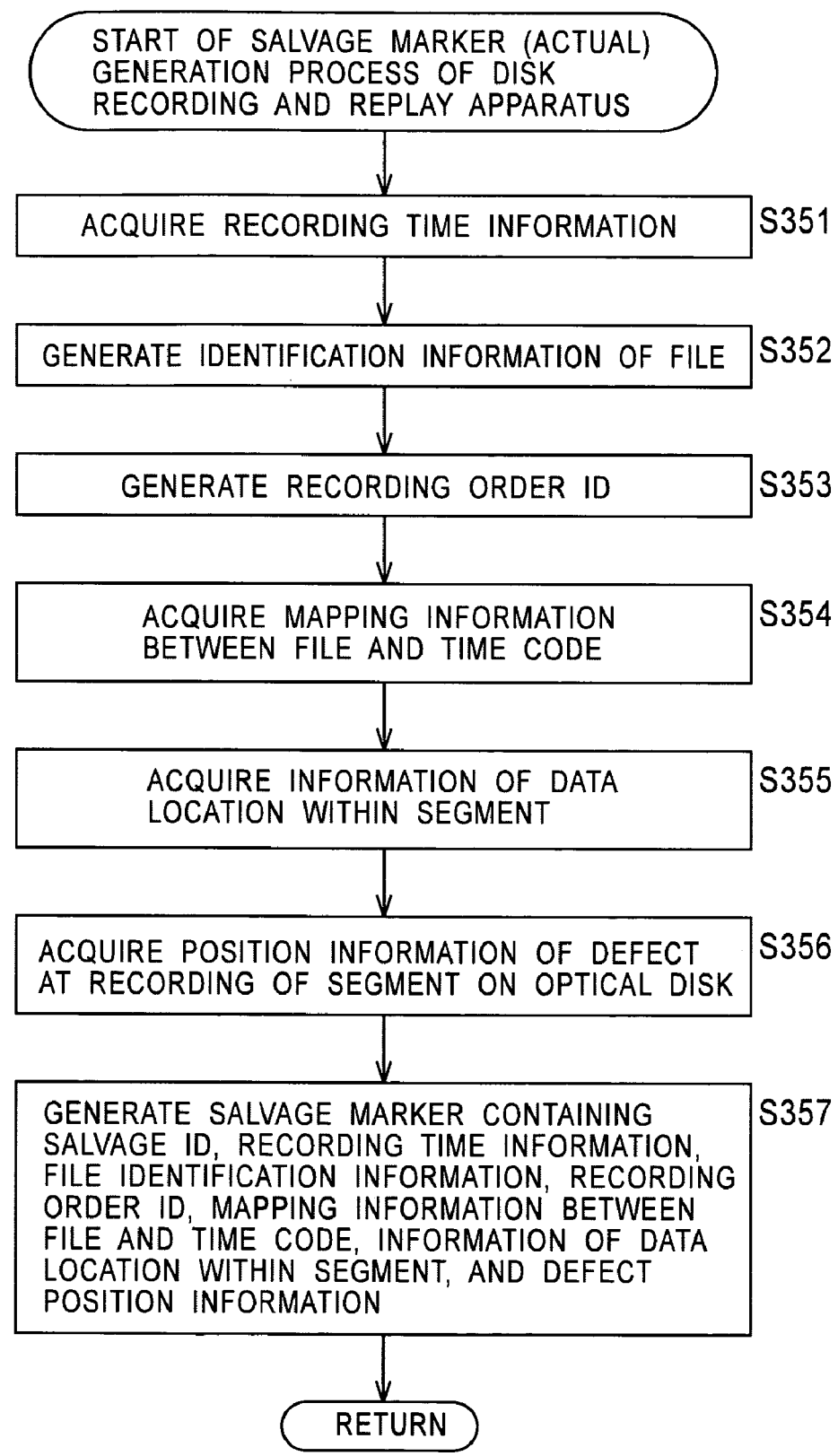
FIG. 14 is a flowchart illustrating in detail a process in step S304 of FIG. 13.

In step S351 of FIG. 14, the salvage generator 21 acquires the current time at that moment (may contain date) from an internal clock as the recording time information. In step S352, the salvage generator 21 generates the identification information of the file. In step S352, like in step S152 of FIG. 7, the salvage generator 21 generates the same identification information from the start to the end of the recording process. The salvage generator 21 generates different identification information when another recording process is initiated subsequent to the completion of the first recording process.

In step S353, the salvage generator 21 generates the recording order ID indicating the recording order of the salvage markers. The generated recording order ID is identical to that generated in step S153 of FIG. 7. In step S354, the salvage generator 21 acquires the mapping information between the file and the time code.

In step S355 subsequent to the process in step S354, the salvage generator 21 acquires the data location information of the audio data and the video data actually recorded in step S303 as illustrated in FIG. 13, from the allocation manager 31 in the controller 20.

In step S356 subsequent to the process in step S355, the salvage generator 21 acquires the defect position information from the allocation manager 31 in the controller 20.

In step S357 subsequent to the process in step S356, the salvage generator 21 generates the salvage marker containing the preset salvage ID, the recording time information acquired in step S351, the identification information of the file generated in step S352, the recording order ID generated in step S353, the mapping information of the file and the time code acquired in step S354, the data location information generated in step S355 and the defect position information acquired in step S356.

FIG. 15 illustrates the generated salvage marker. As shown, the salvage marker contains a salvage ID 61, recording time information 62, file identification information (a file name, for example) 63, an recording order ID 64, data location information 65, and defect position information 66. In addition, the salvage marker may contain mapping information of the file and the time code, although not listed in FIG. 15. It is not a requirement that the salvage marker contain all pieces of information listed in FIG. 15.

The advantage of the salvage marker that contains the salvage ID 61, the recording time information 62, the file identification information (such as the file name) 63, the recording order ID 64, and the data location information 65 is identical to that of the salvage marker shown in FIG. 8.

With the defect position information 66 contained in the salvage marker, the disk recording and replay apparatus can identify a physical position of a defect taking place during the data restoration process.

When the salvage marker (actual) generation process of the disk recording and replay apparatus 10 is complete, the algorithm proceeds to step S305 of FIG. 13.

In step S305, the controller 20 controls the memory controller 17 and the salvage generator 21, thereby supplying the signal processor 16 with the salvage marker generated in step S304. The salvage marker supplied to the signal processor 16 is modulated into a recording signal, and the modulated signal is fed to the pickup unit 13 to be recorded onto the optical disk 11.

In step S306, subsequent to the process in step S305, the controller 20 determines whether or not to complete the recording process by determining whether new audio data and new video data are stored in the memory 18. If it is determined that new audio data and new video data are stored in the memory 18, in other words, if it is determined that the recording process is not yet complete, the algorithm loops to step S302 to repeat step S302 and subsequent steps. If the controller 20 determines in step S306 that new audio data and new video data are not stored in the memory 18, in other words, the controller 20 determines that the recording process has to end, the algorithm proceeds to step S307.

In step S307, the controller 20 produces a file system corresponding to the data recorded on the optical disk 11 in the process in step S301 through step S306, and supplies the signal processor 16 with the file system, thereby updating the file system recorded on the optical disk 11.

The recording operation of the disk recording and replay apparatus 10 for recording the salvage marker corresponding to the segment immediately subsequent to that segment is now complete.

When the salvage marker corresponding to the segment is recorded immediately subsequent to that segment, the data restoration process in step S6 of FIG. 4 becomes different from the process illustrated in FIG. 10. The data restoration process when the salvage marker corresponding to the segment is recorded immediately subsequent to that segment is now described with reference to a flowchart of FIG. 16.

Figure 16:
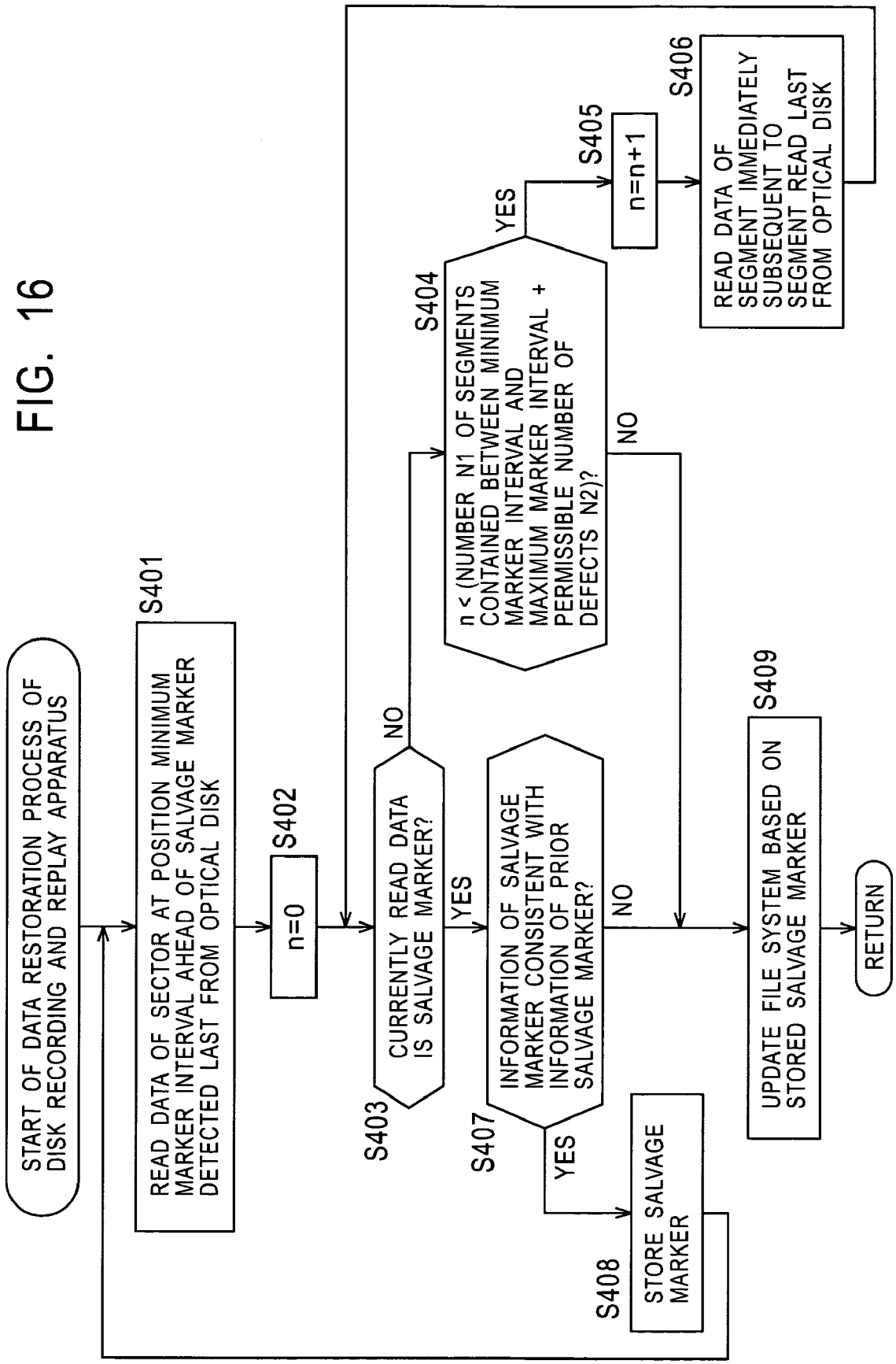
FIG. 16 is another flowchart illustrating in detail the process in step S6 of FIG. 4.

In step S401 illustrated in FIG. 16, the controller 20 reads data of a segment a minimum marker interval ahead of a salvage marker detected last from the optical disk 11. The minimum marker is now discussed. The amount of data contained in one segment can vary within a predetermined range. Accordingly, the interval of the markers that interpose the segment varies in length within a predetermined range. The shortest interval of the salvage markers recorded to interpose the segment is referred to as the minimum marker interval while the longest interval of the salvage markers recorded to interpose the segment is referred to as the maximum marker interval. The minimum marker interval and the maximum marker interval depend on the amount of data contained in the segment, and does not account for a variation in the marker interval that may take place in the case of a defect.

The controller 20 stores beforehand the minimum marker interval and the maximum marker interval. In step S401, the controller 20 controls the servo controller 15, thereby reading data of the segment the minimum marker interval ahead of the salvage marker detected last from the optical disk 11. In the beginning of the restoration process illustrated in FIG. 10, the controller 20 reads the data of the segment the minimum marker interval ahead of the salvage marker detected last in step S204 of FIG. 9.

In step S402, the controller 20 initializes the variable "n", which is incremented one by one in step S405, to zero. In step S403, the controller 20 determines, based on the presence or absence of a salvage ID, whether the data read in step S401 is a salvage marker. If it is determined that the data read in step S401 is not a salvage marker (if no salvage ID is detected), the algorithm proceeds to step S404.

In step S404, the controller 20 determines whether the variable "n" is n<(N1+N2). "N1" represents the number of segments contained between the minimum marker interval and the maximum marker interval. "N2" represents the predetermined permissible number of defects.

If the controller 20 determines that the relationship n<(N1+N2) holds, the algorithm proceeds to step S405 to increment the variable "n" by one. In step S406, the controller 20 controls the servo controller 15, thereby reading the data of the segment located immediately subsequent to the segment read last from the optical disk 11. The algorithm loops to step S403 to repeat step S403 and subsequent steps. In this case, in step S403, the controller 20 determines whether the data read from the optical disk 11 in step S406 is a salvage marker.

Returning to step S404, if the controller 20 determines that the variable "n" does not satisfy the condition of n<(N1+N2) (i.e., n≧(N1+N2)), the algorithm proceeds to step S409.

If the controller 20 determines in step S403 that the data read in step S401 (or step S406) is a salvage marker (i.e., a salvage marker ID is contained in the read salvage marker), the algorithm proceeds to step S407.

In step S407, the controller 20 determines whether information contained in the read salvage marker is consistent with information contained in the salvage marker read before. The process in step S407 is identical to the process in step S258 of FIG. 10, and the detailed discussion of step 407 is omitted here. If the controller 20 determines in step S407 that the salvage marker read in step S401 (or step S406) is consistent with the immediately prior read salvage marker, the algorithm proceeds to step S408.

In step S408, the controller 20 supplies the memory controller 17 with the salvage marker read in step S401 (or step S406) from the optical disk 11, thereby causing the memory 18 to store the salvage marker. The algorithm loops to step S401 to repeat step S401 and subsequent steps. In step S401 executed subsequent to step S408, the controller 20 acquires the data of the segment the minimum marker interval ahead of the salvage marker stored in the memory 18 in step S408.

If the controller 20 determines in step S407 that the salvage marker read in step S401 (or step S406) is not consistent with the immediately prior read salvage marker, the algorithm proceeds to step S409.

Based on the salvage marker stored until then in the memory 18 in step S408, the controller 20 registers in step S409 the audio data and the video data, which have failed to be filed due to an interruption in the middle of recording, in a file in the file system of the optical disk 11 through the signal processor 16, the pickup unit 13, etc. In other words, the controller 20 extracts the data location information from the salvage marker stored in the memory 18. As already discussed, the data location information contains information of the type of data (the audio data and the video data) identified by each salvage marker and information of the recording position (the physical address) of the data on the optical disk 11. Based on the data location information, the controller 20 registers the file in the file system with the physical recording position of the audio data and the video data contained in the file mapped with the file. In this way, the video data and the audio data, the recording of which has failed to normally end and the reading of which has been unsuccessful, can now be read.

The data restoration process of the disk recording and replay apparatus 10 for recording the salvage marker corresponding to the segment immediately subsequent to that segment has been discussed.

The above arrangement provides the advantage that the defect position information concerning the segment already recorded on the optical disk 11 is contained in the salvage marker by recording the salvage marker immediately subsequent to the corresponding segment. If the salvage marker contains no defect position information, noise can be generated due to a "defect" during the replay of data. If the salvage marker contains the defect position information, the generation of noise due to the "defect" is prevented.

In the above discussion, the salvage marker corresponding to the segment is recorded immediately prior to the segment in one case, and the salvage marker corresponding to the segment is recorded immediately subsequent to the segment in another case. Alternatively, the salvage marker corresponding to the segment may be recorded at each of both locations immediately prior to and immediately subsequent to the segment. The recording order of the data is discussed with reference to FIG. 17.

Figure 17:
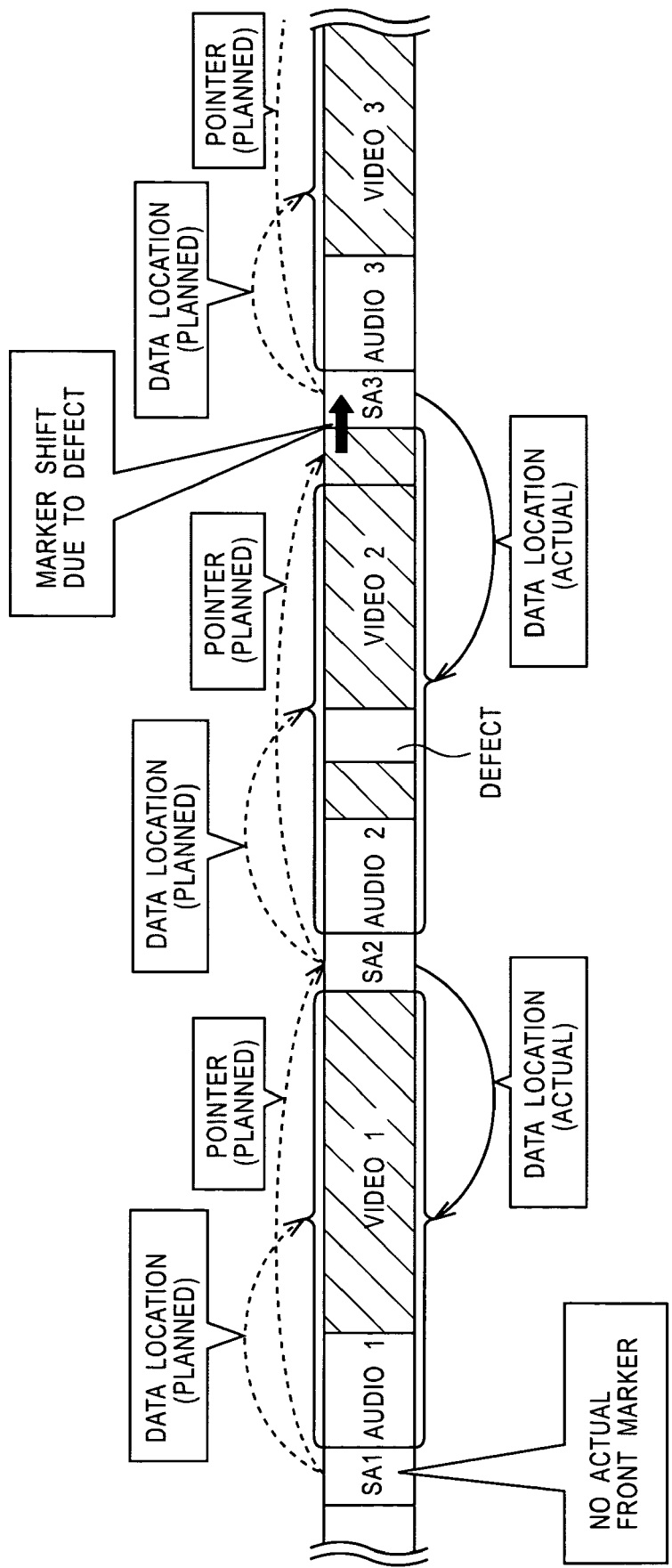
FIG. 17 is a chart illustrating another example of information contained in the salvage marker.

FIG. 17 is a chart illustrating an example of the recording order of the data that is recorded on the optical disk 11 when the salvage markers corresponding to the segment are recorded at each of the two locations immediately prior to and immediately subsequent to the segment.

FIG. 17 shows part of the recording areas of the optical disk 11. Arranged in order from left as shown in FIG. 17 are "SA1", "audio 1", "video 1", "SA2", "audio 2", "video 2", "SA3", "audio 3", and "video 3". "SA1" represents a salvage marker 1, "audio 1" represents audio data 1, "video 1" represents video data 1, "SA2" represents a salvage marker 2, "audio 2" represents audio data 2, "video 2" represents video data 2, "SA3" represent a salvage marker 3, "audio 3" represents audio data 3, and "video 3" represents video data 3.

Recording areas of the video data 1, the video data 2 and the video data 3 are represented by hatched areas. The recording area of the video data 2 contains a "defect" in the middle of recording. This means that data is not recorded there in the recording area for some reasons.

The salvage marker 1 contains information relating to the audio data 1 and the video data 1. The salvage marker 2 contains information relating to the audio data 1, the video data 1, the audio data 2 and the video data 2. The salvage marker 3 contains information relating to the audio data 2, the video data 2, the audio data 3 and the video data 3. As shown in FIG. 17, the audio data 1 and the video data 1 form one segment, the audio data 2 and the video data 2 form another segment, and the audio data 3 and the video data 3 form another segment.

Information contained in the salvage marker 1 shown in FIG. 17 is identical to the salvage marker 1 shown in FIG. 5, and the discussion thereof is omitted here. As shown in FIG. 17, a "data location (planned)" pointed by an arrow-headed broken line extending from the salvage marker 2 is a single piece of information to be recorded in the salvage marker 2. Recorded in the salvage marker 2 are the type of data (the audio data 2 and the video data 2 in FIG. 17) recorded subsequent to the salvage marker 2 and information relating to a recording area (the recording area of the audio data 2 and the recording area of the video data 2 as shown in FIG. 17) of the data recorded subsequent to the salvage marker 2. As shown in FIG. 17, a "pointer (planned)" pointed by an arrow-headed broken line extending from the salvage marker 2 is a single piece of information to be recorded in the salvage marker 2. More specifically, the salvage marker 2 contains a planned recording position of a salvage marker to be recorded in succession to the salvage marker 2 on the optical disk 11, namely, the planned recording position of the salvage marker 3.

As shown in FIG. 17, a "data location (actual)" pointed by an arrow-headed solid line extending from the salvage marker 2 is a single piece of information to be recorded in the salvage marker 2. Recorded in the salvage marker 2 are the type of data (the audio data 1 and the video data 1 in FIG. 17) recorded prior to the salvage marker 2 and information relating to a recording area (the recording area of the audio data 1 and the recording area of the video data 1 as shown in FIG. 17).

In addition, the salvage marker 2 may contain a salvage ID, recording time information of data, identification information for identifying a file, a recording order ID indicating the recording order of the salvage marker, mapping information for mapping the audio data 1 and the video data 1 with a time code, and mapping information for mapping the audio data 2 and the video data 2 with a time code.

The salvage marker 3 may contain a salvage ID, data location information (planned) of the audio data 3 and the video data 3, data location information (actual) of the audio data 2 and the video data 2, a planned recording position of a salvage marker 4 (not shown), defect position information of a defect taking place in the video data 2, recording time information of the data, identification information for identifying the file, a recording order ID indicating the recording order of the salvage marker, mapping information for mapping the audio data 2 and the video data 2 with the time code, and mapping information for mapping the audio data 3 and the video data 3 with a time code.

Figure 7:
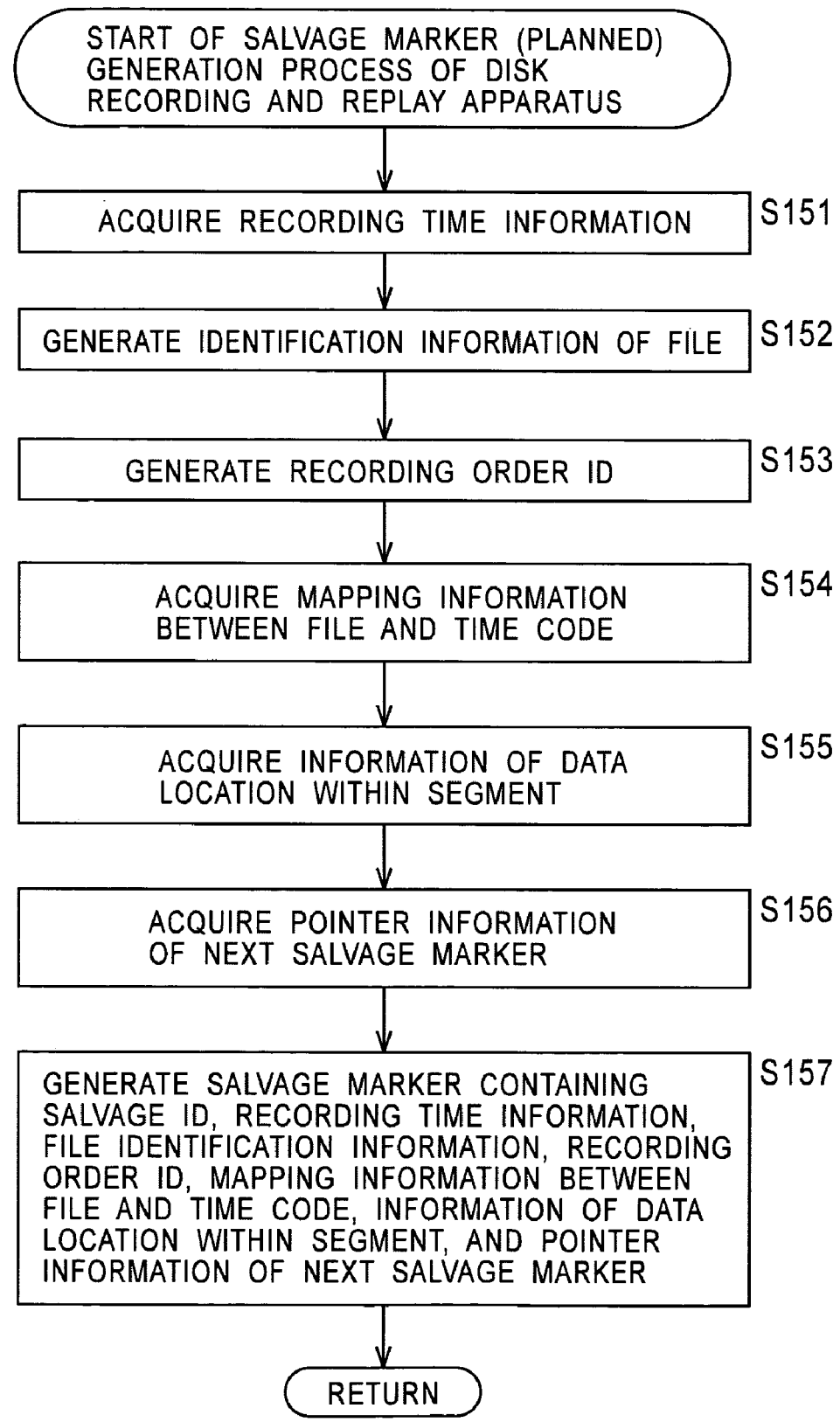
FIG. 7 is a flowchart illustrating in detail a process in step S103 of FIG. 6.

Recorded in the salvage marker shown in FIG. 17 are information relating to data recorded between one salvage marker and another salvage marker immediately prior to the one salvage marker, and information relating to data recorded between the one salvage marker and another salvage marker immediately subsequent to the one salvage marker. In the example of FIG. 7, the one salvage marker may contain information relating to the recording position of the immediately prior salvage marker and information relating to the recording position of the immediately subsequent salvage marker with respect to the recording medium.

Figure 18:
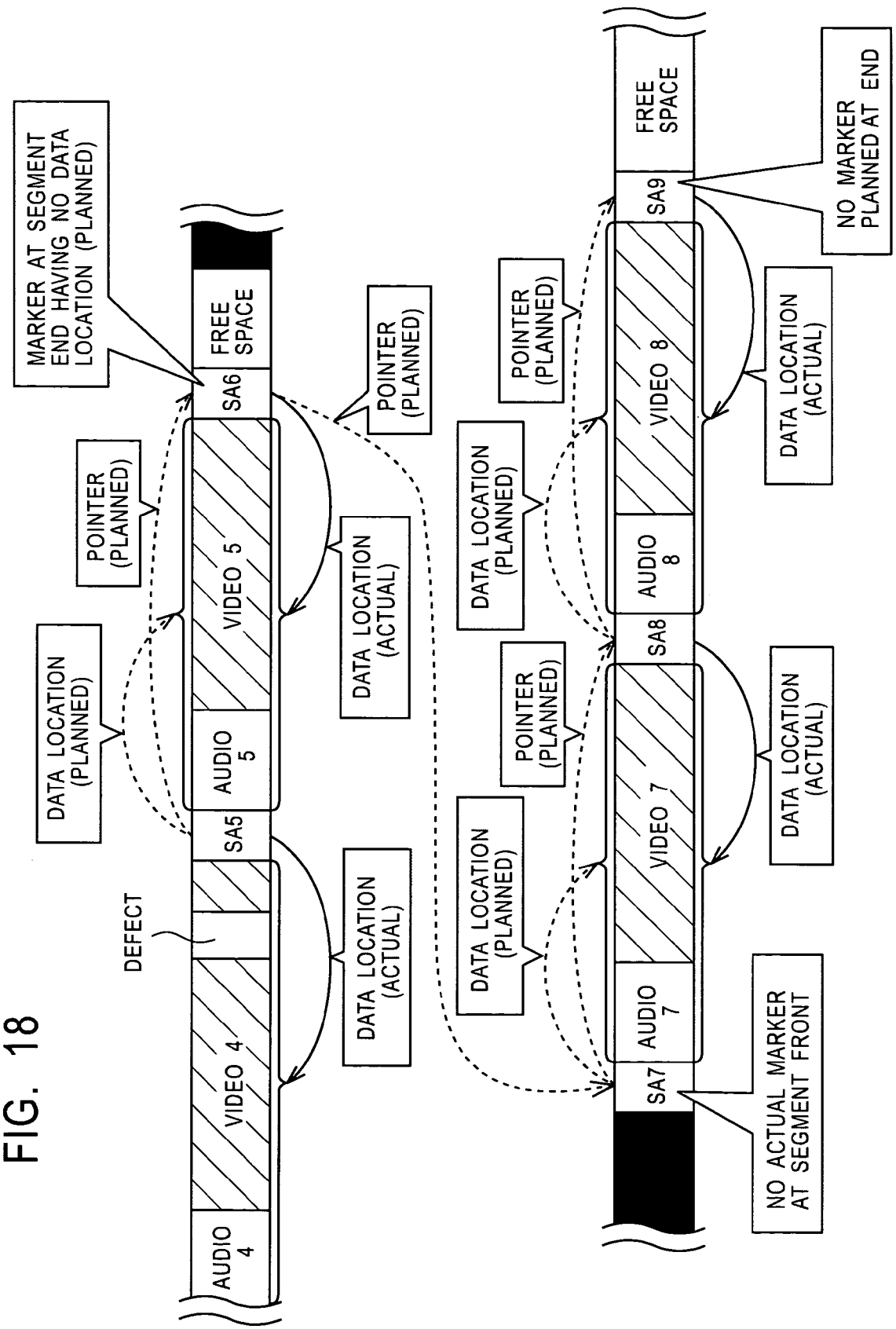
FIG. 18 is a chart illustrating an example of information contained in the salvage marker.

FIG. 18 illustrates an example of recorded data in which data recording is continued in another free space on the optical disk 11 when one space becomes full with no more free space available in the middle of recording data on the optical disk 11. As shown in FIG. 18, portions of the recording area of the optical disk 11 are drawn in upper and lower bands.

As shown, space becomes full with no free space available in the middle of the data recording in the recorder area on the upper portion, and the data is continuously recorded in the recording area on the lower portion.

Arranged in order from left on the upper portion as shown in FIG. 18 are "audio 4", "video 4", "SA5", "audio 5", "video 5", and "SA6". Arranged in order from left on the lower portion are "SA7", "audio 7", "video 7", "SA8", "audio 8", "video 8", and "SA9". "Audio 4" represents audio data 4, "video 4" represents video data 4, "SA5" represents a salvage marker 5, "audio 5" represents audio data 5, "video 5" represents video data 5, "SA6" represents a salvage marker 6, "SA7" represents a salvage marker 7, "audio 7" represents audio data 7, "video 7" represents video data 7, "SA8" represents a salvage marker 8, "audio 8" represents audio data 8, "video 8" represents video data 8, and "SA9" represents a salvage marker 9.

As shown in FIG. 18, the audio data 4 and the video data 4 form one segment, the audio data 5 and the video data 5 form another segment, the audio data 7 and the video data 7 form yet another segment, and the audio data 8 and the video data 8 form still another segment.

A free space sufficient to accommodate one segment is not present immediately subsequent to the salvage marker 6 as shown in FIG. 18. In such a case, the data expected to be recorded, i.e., the location information of the audio data 7 and the video data 7, is not recorded in the salvage marker 6. No data location information (actual) is recorded in the salvage marker 7 recorded prior to the audio data 7 and the video data 7 expected recorded next. Neither data location information (planned) nor pointer information is recorded in the salvage marker 9, which is recoded after all series of data is recorded.

The recording process (step S9 in FIG. 4) for recording the salvage marker corresponding to the segment at each of the locations immediately prior to and immediately subsequent to the segment will now be discussed with reference to flowcharts of FIGS. 19 and 20.

Figure 19:
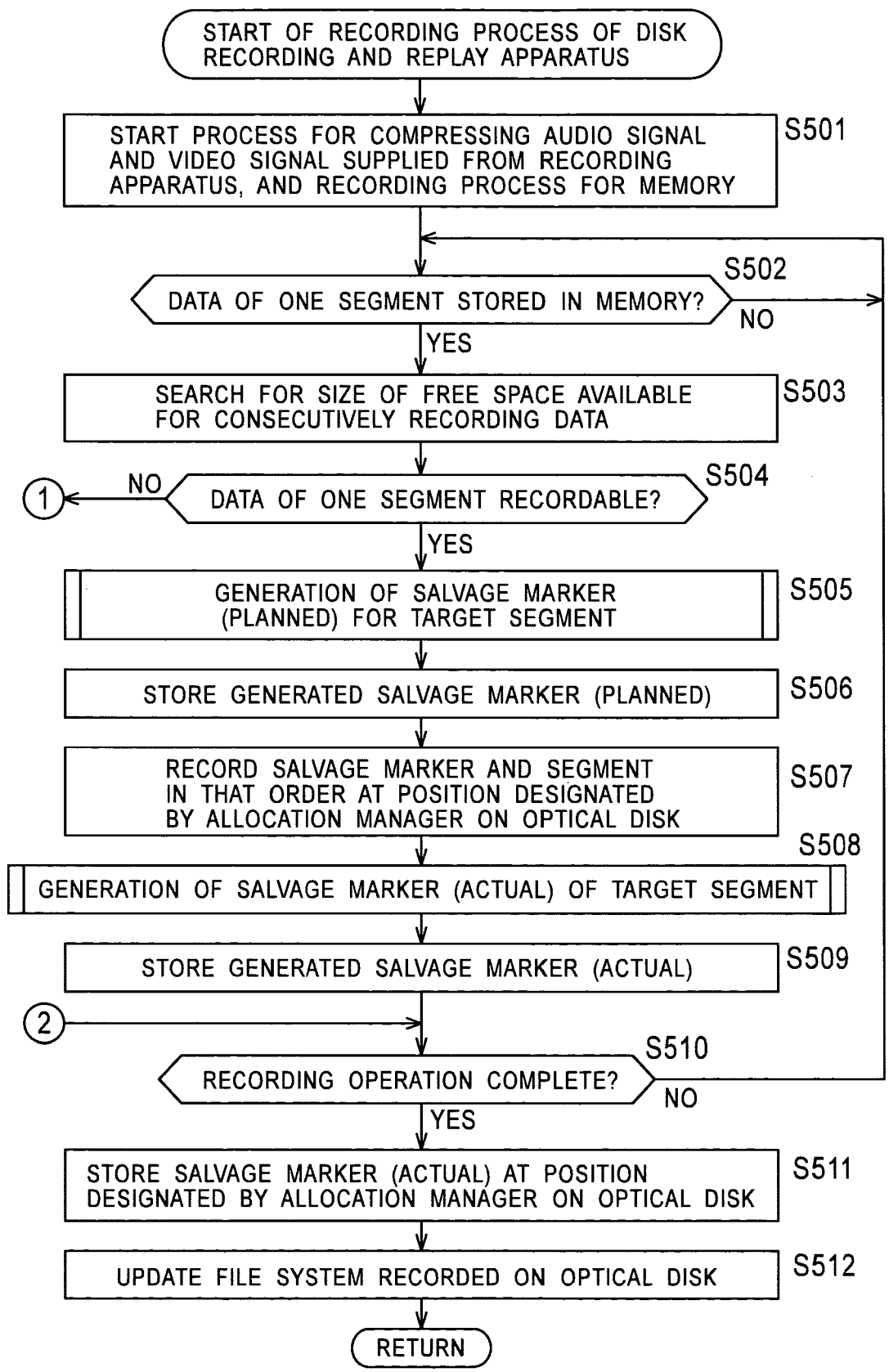
FIG. 19 is another flowchart illustrating in detail the process in step S9 of FIG. 4.

In step S501 in FIG. 19, the controller 20 controls the data converter 19, thereby starting a compression process for compressing an audio signal and a video signal supplied from the signal input/output device 41 to the disk recording and replay apparatus 10. The controller 20 also controls the memory controller 17, thereby starting a storage process for storing, in the memory 18, the audio data and the video data provided as a result of the compression process of the data converter 19.

In step S502, the controller 20 monitors the memory 18 through the memory controller 17, thereby determining whether one segment of audio data and video data is stored in the memory 18. The controller 20 waits on standby until it is determined that one segment of audio data and video data is stored in the memory 18. When the one segment of audio data and video data is stored in the memory 18, the algorithm proceeds to step S503.

In step S503, the allocation manager 31 searches for the size of free space available for consecutively recording data.

In step S504, the allocation manager 31 determines whether one segment of data is recordable in the free space found in the search in step S503. If it is determined that the one segment of data is recordable, the algorithm proceeds to step S505. In step S505, the controller 20 causes the salvage generator 21 to generate a salvage marker (planned). The salvage generator 21 generates the salvage marker (planned) in the process of the flowchart shown in FIG. 7. In step S506, the controller 20 feeds the salvage marker (planned), generated by the salvage generator 21 in step S505, to the memory 18 for storage from the salvage generator 21 through the memory controller 17.

In step S507, the controller 20 controls the memory controller 17, thereby supplying the signal processor 16 with the salvage marker stored in the memory 18 in step S506 and the one segment of audio data and video data determined to be stored in the memory 18 in step S502 in the order of the salvage marker, the audio data and the video data. The salvage marker, the audio data and the video data supplied to the signal processor 16 are modulated into recording signals in that order, and the modulated signals are fed to the pickup unit 13 to be recorded onto the optical disk 11. In the process in step S507 subsequent to the completion of the process in step S509 to be discussed later, the salvage marker (actual) generated in step S509 to be discussed later is also stored together onto the optical disk 11.

In step S508 subsequent to the process in step S507, the controller 20 causes the salvage generator 21 to generate a salvage marker (actual). The salvage generator 21 generates the salvage marker (actual) in the process in the flowchart of FIG. 14. In step S509, the controller 20 feeds the salvage marker (actual), generated by the salvage generator 21 in step S508, to the memory 18 for storage from the salvage generator 21 through the memory controller 17.

In step S510 subsequent to the process in step S509, the controller 20 determines whether or not to end the recording process by determining whether the memory 18 stores new audio data and new video data. If it is determined that new audio data and new video data are stored in the memory 18, i.e., if it is determined that the recording process is not yet complete, the algorithm proceeds to step S502 to repeat step S502 and subsequent steps.

As already discussed, in step S507 performed subsequent to the process in step S510, both the salvage marker (planned) stored in the memory 18 in step S509 and the salvage marker (planned) stored in the memory 18 in step S506 are read and stored on the optical disk 11. In this case, the salvage marker (planned) and the salvage marker (actual) are recorded as one salvage marker. From among pieces of information contained in the salvage marker (actual), the salvage ID, the recording time information, the identification information of the file, the recording order ID, and the mapping information of the file and the time code are already contained in the salvage marker (planned) recorded prior to the corresponding segment, and may be thus deleted.

If the controller 20 determines in step S510 that new audio data and new video data are not stored in the memory 18, i.e., if the controller 20 determines that the recording process has to end, the algorithm proceeds to step S511.

In step S511, the controller 20 controls the memory controller 17, thereby supplying the signal processor 16 with the salvage marker (actual) stored in the memory 18 in step S509. The salvage marker (actual) supplied to the signal processor 16 is modulated into a recording signal, and is fed to the pickup unit 13 to be recorded onto the optical disk 11.

In step S512 subsequent to the process in step S511, the controller 20 produces the file system corresponding to the data recorded on the optical disk 11 in the process in step S501 through step S511, and feeds the file system to the signal processor 16, thereby updating the file system recorded on the optical disk 11.

Figure 20:
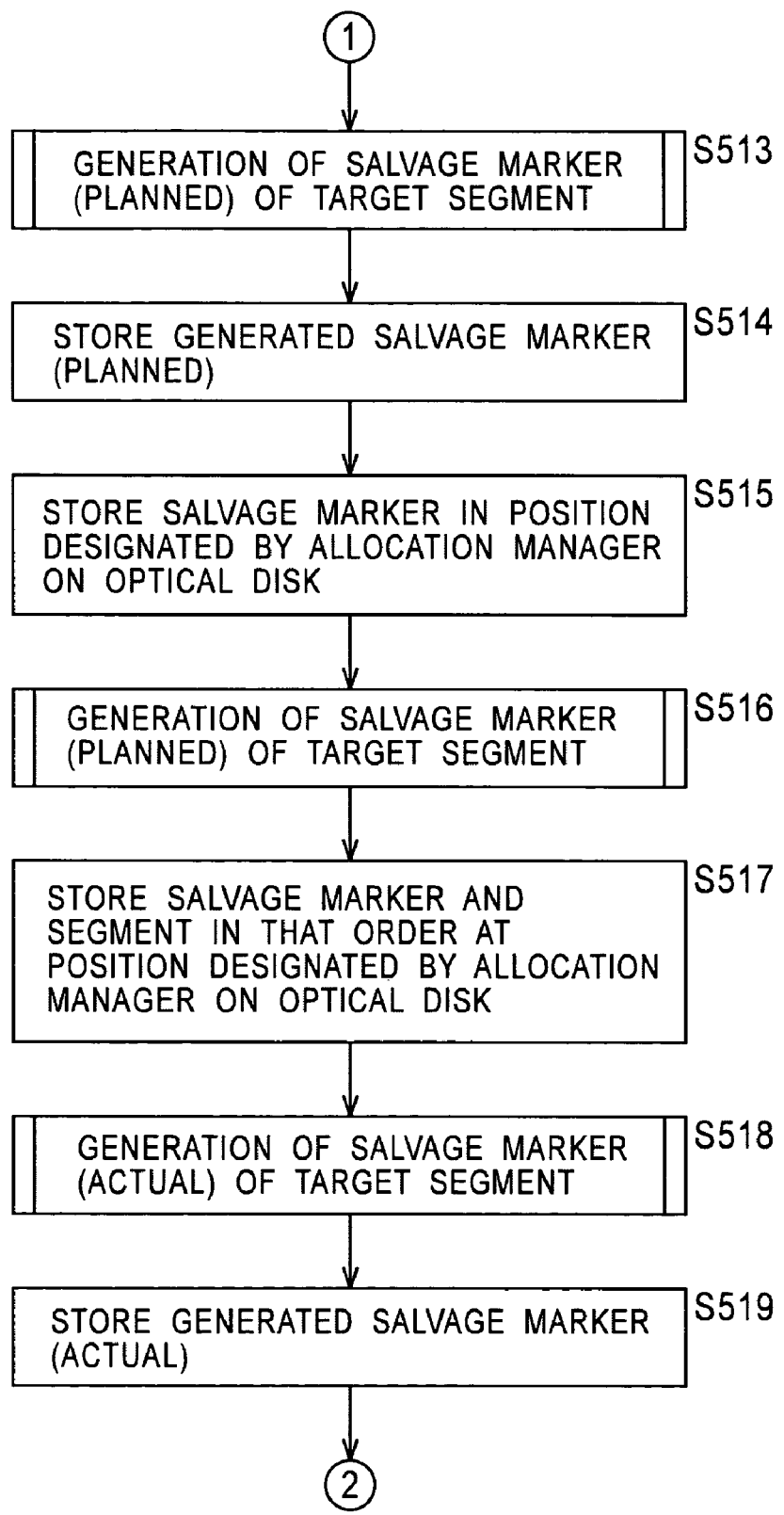
FIG. 20 is a continuation of the flowchart of FIG. 19 illustrating in detail the process in step S9 of FIG. 4.

Returning to step S504, if the allocation manager 31 determines that the free space found in the search in step S503 is unable to accommodate the one segment of data, the algorithm proceeds to step S513 of FIG. 20. In step S513, the controller 20 causes the salvage generator 21 to generate the salvage marker (planned). The salvage generator 21 generates the salvage marker (planned) in the process of the flowchart of FIG. 7. In this case, the process in step S155 of FIG. 7 is not carried out. The salvage marker (planned) generated in step S513 contains no data location information. In step S514, the controller 20 feeds the salvage marker (planned) generated by the salvage generator 21 in step S513 to the memory 18 for storage from the salvage generator 21 through the memory controller 17.

In step S515, the controller 20 controls the memory controller 17, thereby supplying the signal processor 16 with the salvage marker (actual) stored in the memory 18 in step S509 of FIG. 19 and the salvage marker (planned) stored in the memory 18 in step S514. The salvage markers supplied to the signal processor 16 are modulated into recording signals, which are then fed to the pickup unit 13 to be recorded onto the optical disk 11. In this case as well, the salvage marker (planned) and the salvage marker (actual) are recorded as one salvage marker. From among pieces of information contained in the salvage marker (actual), the salvage ID, the recording time information, the identification information of the file, the recording order ID, and the mapping information of the file and the time code are already contained in the salvage marker (planned) recorded prior to the corresponding segment, and may be thus deleted.

In step S516 subsequent to the process in step S515, the controller 20 causes the salvage generator 21 to generate a salvage marker (planned). The salvage generator 21 generates the salvage marker (planned) in accordance with the process of FIG. 7. In step S517, the controller 20 controls the salvage generator 21 and the memory controller 17, thereby recording the salvage marker generated in step S516 and the one segment of audio data and video data determined to be stored in step S502 at a recording position on the optical disk 11 designated by the allocation manager 31. More specifically, the salvage generator 21 supplies the signal processor 16 with the salvage marker (planned) generated in step S516, and then, the memory controller 17 supplies the signal processor 16 with the one segment of audio data and video data stored in the memory 18. The salvage marker (planned), the audio data and the video data supplied to the signal processor 16 are modulated into recording signals in that order, and then supplied to the pickup unit 13 to be recorded onto the optical disk 11.

In step S518 subsequent to the process in step S517, the controller 20 causes the salvage generator 21 to generate a salvage marker (actual). The salvage generator 21 generates the salvage marker (actual) in the process of the flowchart of FIG. 14. In step S519, the controller 20 feeds the salvage marker (actual), generated by the salvage generator 21 in step S518, to the memory 18 for storage from the salvage generator 21 through the memory controller 17. Subsequent to the process in step S519, the algorithm proceeds to step S510 of FIG. 19 to repeat step S510 and subsequent steps already discussed.

The recording process of the disk recording and replay apparatus 10 for recording the salvage marker corresponding to the segment to each of the two locations immediately prior to and immediately subsequent to the segment is thus complete.

As described above, the data restoration process in the recording of the corresponding salvage markers prior to and subsequent to the segment is identical to the process illustrated in FIG. 10.

In the above discussion, the audio data and the video data are recorded in that order within one segment on the optical disk 11. Alternatively, the video data and the audio data may be recorded in that order. Data to be recorded may include data other than the audio data and the video data. For example, meta data containing information about the audio data and the video data may be recorded together with the audio data and the video data on the optical disk. In the data restoration process, the meta data is also registered in the file system.

The audio data and the video data may be recorded as different files. For example, the audio data and the video data are recorded as separate files when the salvage marker relating to the audio data and the video data is recorded prior to the audio data and the video data as shown in FIG. 5, when the salvage marker is recorded subsequent to the audio data and the video data corresponding thereto as shown in FIG. 12, or when the salvage marker is recorded at both locations prior to and subsequent to the audio data and the video data as shown in FIG. 17 and FIG. 18. An example of the salvage marker that is recorded prior to the video data and the audio data corresponding thereto will be discussed later with reference to FIG. 25.

In this case, salvage markers may be recorded respectively for the video data and the audio data.

Figure 21:
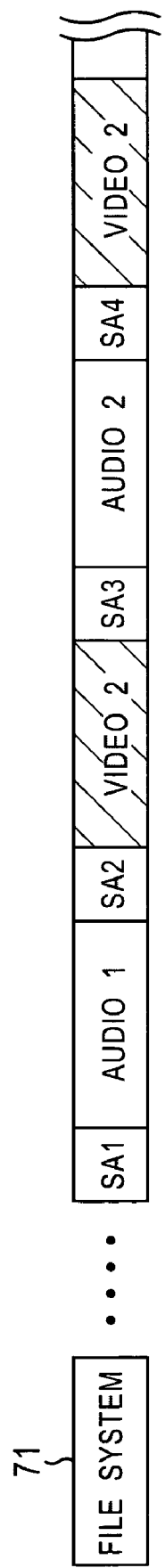
FIG. 21 is a chart illustrating an example of a recording position of the salvage marker.

FIG. 21 illustrates a recording example of data that is recorded on the optical disk 11 when the salvage markers are respectively recorded for the video data and the audio data.

Referring to FIG. 21, the file system 71 is arranged on the left-hand side. Recorded apart from the file system 71 are "SA1", "audio 1", "SA2", "video 1", "SA3", "audio 2", "SA4", and "video 2" in that order. "SA1" represents a salvage marker 1, "audio 1" represents audio data 1, "SA2" represents a salvage marker 2, "video 1" represents video data 1, "SA3" represents a salvage marker 3, "audio 2" represents audio data 2, "SA4" represents a salvage marker 4, and "video 2" represents video data 2.

As understood from the comparison of FIG. 21 with FIG. 5, a salvage marker is arranged in each border between the audio data and the video data in FIG. 21. The salvage marker 1 contains information relating to the audio data 1, the salvage marker 2 contains information relating to the video data 1, the salvage marker 3 contains information relating to the video data 2, and the salvage marker 4 contains information relating to the video data 2. To arrange the audio data and the video data in different files, identification information for identifying files contained in the salvage marker 1 and the salvage marker 3 is different from identification information for identifying files contained in the salvage marker 2 and the salvage marker 4. More specifically, the identification information for identifying files contained in the salvage marker 1 and the salvage marker 3 is identification information for identifying files of audio data (hereinafter referred to as audio data files), and the identification information for identifying files contained in the salvage marker 2 and the salvage marker 4 is identification information for identifying files of video data (hereinafter to referred to as video data files).

Figure 22:
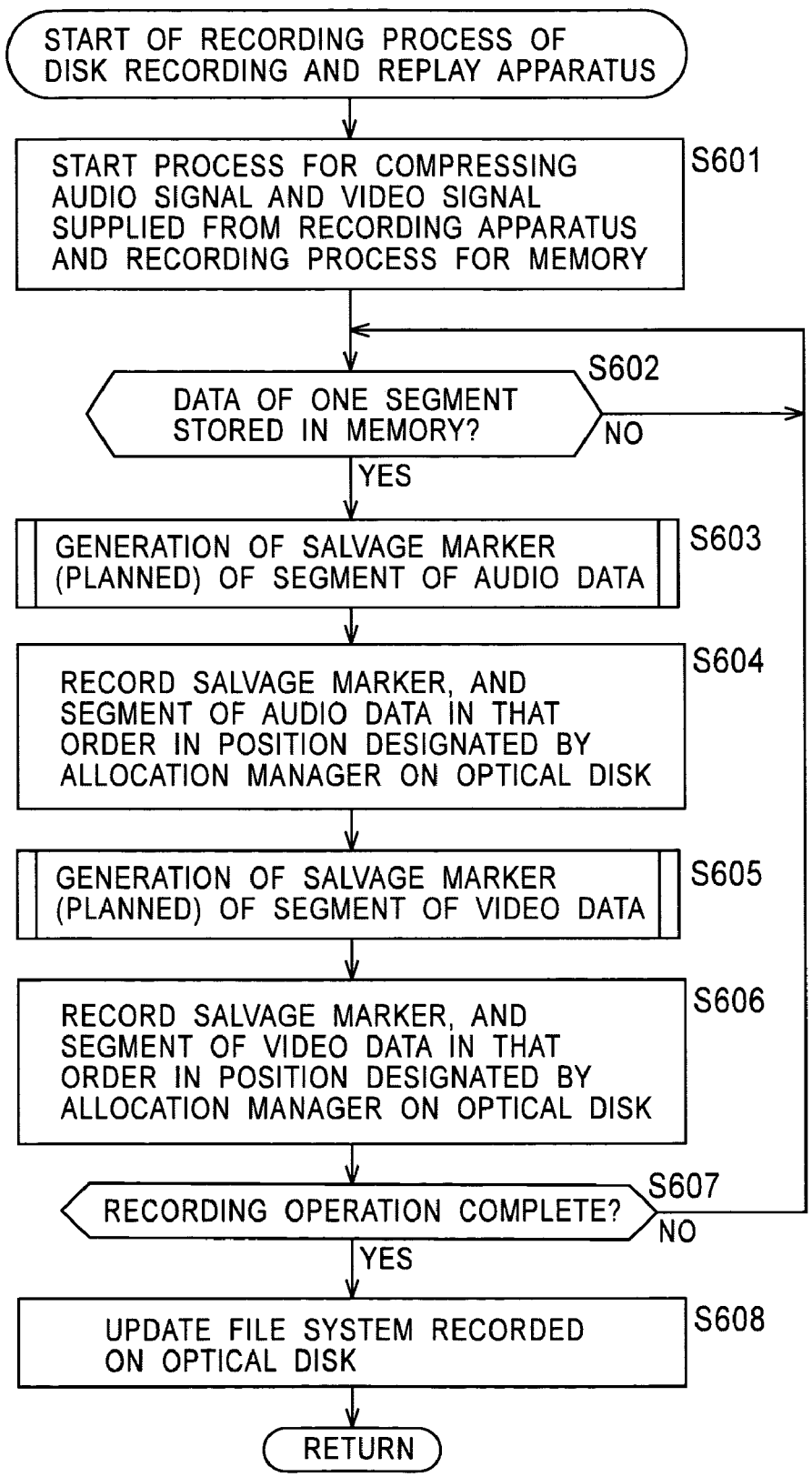
FIG. 22 is another flowchart illustrating in detail the process in step S9 of FIG. 4.

If data is recorded as illustrated in FIG. 21, a recording process is performed as illustrated in FIG. 22. As understood from the comparison of a flowchart of FIG. 22 with the flowchart of FIG. 6, the process in step S603 through step S606 in the process represented by the flowchart of FIG. 22 is different from the process in step S103 through step S104 in the flowchart of FIG. 6, and the remaining of the process of the flowchart of FIG. 22 is identical to the process of the flowchart of FIG. 6.

If one segment of data is stored in the memory 18 in step S602 of FIG. 22, the salvage generator 21 generates a salvage marker (planned) of the segment of audio data (for example, audio data 1 in FIG. 21) in step S603. Although the detailed process in step S603 is identical to the process represented by the flowchart of FIG. 7, the salvage generator 21 generates the identification information for identifying the audio data file in step S152 of the flowchart of FIG. 7 if the audio data and the video data are organized as different files.

In step S604 subsequent to the process in step S603, the salvage marker and the segment of audio data, generated in step S603, are recorded on the optical disk 11, and the algorithm proceeds to step S605.

In step S605, the salvage generator 21 generates a salvage marker (planned) of a segment of video data (for example, video data 1 of FIG. 21). Although the detailed process in step S605 is identical to the process represented by the flowchart of FIG. 7, the salvage generator 21 generates the identification information for identifying the video data file in step S152 of the flowchart of FIG. 7 if the audio data and the video data are organized in different files. The identification information for identifying the file generated in step S605 is different from the identification information for identifying the file generated in step S603.

In step S606 subsequent to the process in step S605, the salvage marker and the segment of video data, generated in step S605, are recorded on the optical disk 11, and the algorithm proceeds to step S607.

Since the processes in step S601, step S602, step S607, and step S608 in FIG. 22 are respectively identical to the processes in step S101, step S102, step S105, and step S106 in FIG. 6, the discussion thereof is omitted here.

When the audio data and the video data are organized as different files, the identification information for identifying the audio data file is set to be different from the identification information for identifying the video data file. This arrangement allows the disk recording and replay apparatus to identify what file each segment belongs to in a later data restoration process. Discussed next is the data restoration process with the audio data and the video data set in different files. The data restoration process is substantially identical to the process of the flowchart of FIG. 10. However, the process in step S206, i.e., a process for updating the file system, is different from the counterpart in the case where the audio data and the video data are organized in the same file.

Figure 23:
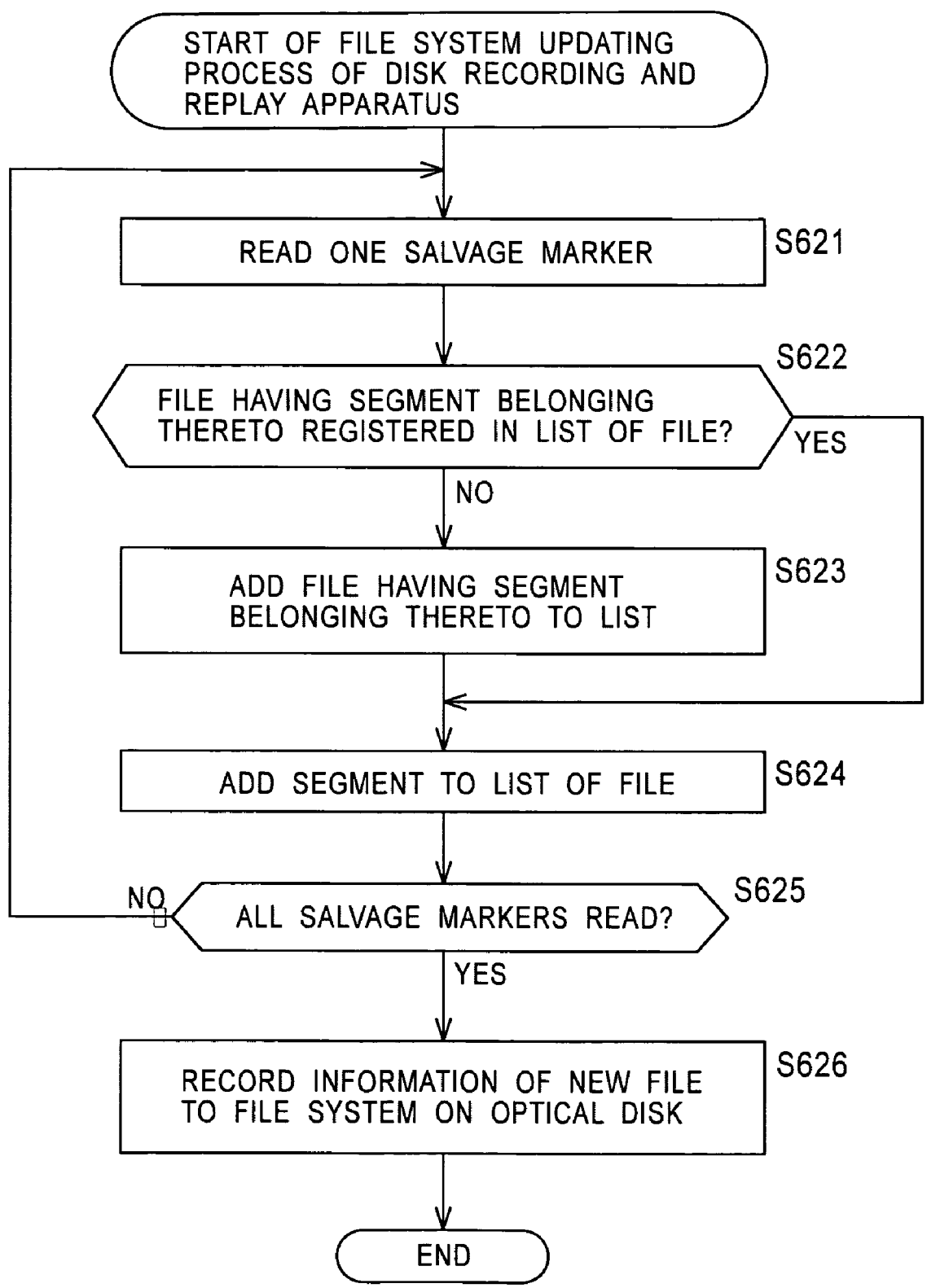
FIG. 23 is a flowchart illustrating a file system updating process.

A file system updating process with the audio data and the video data set in different files will now be discussed with a flowchart of FIG. 23.

In step S621, the controller 20 reads one salvage marker stored in the memory 18 through the memory controller 17.

In step S622, the controller 20 determines, based on the identification information for identifying the file contained in the salvage marker read in step S621, whether the file of the segment, identified by the salvage marker, has already been registered in a list of files. If it is determined that the file of the segment, identified by the salvage marker, has not been registered in the list of files, the algorithm proceeds to step S623.

In step S623, the controller 20 adds, to the file list for storage, the identification information (file name) of the file of the segment identified by the salvage marker read in step S621. Then, the algorithm proceeds to step S624.

If the controller 20 determines in step S622 that the file of the segment, identified by the salvage marker, has been registered in the list of files, the algorithm proceeds to step S624 with the process in step S623 skipped.

In step S624, the controller 20 classifies the segment identified by the salvage marker read in step S621 as a segment associated with the file. FIG. 24 illustrates the list of files and the segments associated with the files.

Referring to FIG. 24, the list of files, i.e., "audio data file" and "video data file" are listed on the left-hand side, and segments are listed file by file on the right-hand side. Referring more specifically to FIG. 24, segments "audio 1", "audio 2", "audio 3", . . . are classified as the audio data files, and segments "video 1", "video 2", "video 3", . . . are classified as the video data files.

In step S625 subsequent to step S624, the controller 20 determines whether all salvage markers are read from the memory 18. If it is determined that any salvage marker remains to be read, the algorithm loops to step S621 to repeat step S621 and subsequent steps.

If the controller 20 determines in step S625 that all salvage markers have been read, the algorithm proceeds to step S626.

In step S626, the controller 20 registers, as a new file in the file system 71, the file (the audio data file and the video data file) having the segments classified as illustrated in FIG. 24.

Data is restored even when the audio data and the video data are organized as different files.

In the case of FIGS. 21 through 24, the salvage marker containing information relating to the audio data is arranged immediately prior to that audio data, and the salvage marker containing information relating to the video data is arranged immediately prior to that video data. The audio data and the video data can be recorded as separate files when the salvage marker containing information relating to the audio data is arranged immediately subsequent to that audio data, and the salvage marker containing information relating to the video data is arranged immediately subsequent to that video data, or when the salvage markers containing information relating to the audio data is respectively arranged immediately prior to and immediately subsequent to that audio data, and the salvage markers containing information relating to the video data are respectively arranged immediately prior to and immediately subsequent to that video data.

The audio data and the video data, which are arranged as shown in FIG. 5, may be organized in different files. In this case, the salvage marker contains information as shown in FIG. 25.

As understood from the comparison of FIG. 25 with FIG. 8, the salvage marker of FIG. 25 contains identification information 53-1 for identifying the audio data file, and identification information 53-2 for identifying the video data file. Such an arrangement is also possible.

In accordance with the present invention, the data, the recording of which is interrupted and ended with abnormal state, is restored.

In the above discussion, the same disk recording and replay apparatus 10 performs the recording process, the restoration execution determination process, the data restoration process, the replay process of the optical disk 11, etc. Alternatively, a recording apparatus executing the recording process, a salvage apparatus performing the restoration execution determination process and the data restoration process, and a replay apparatus replaying an optical disk may be separate apparatuses. More specifically, the recording apparatus, having neither the function for performing the restoration execution determination process nor the data restoration process and the function for replaying the optical disk, may perform the recording process illustrated in FIG. 6. The salvage apparatus, having no function for performing the recording process and the replay process of the optical disk, may perform the restoration execution determination process illustrated in FIG. 9, and the data restoration process illustrated in FIG. 10. The replay apparatus, having no function for performing the recording process of the optical disk, the restoration execution determination process and the data restoration process, may perform the replay process of the optical disk. A recording and replay apparatus, having no function for performing the restoration execution determination process and the data restoration process, may perform the recording process and the replay process of the optical disk. The recording apparatus, having no function for performing the replay function of the optical disk, may perform the recording process, the restoration execution determination process and the data restoration process. The replay apparatus having no function for performing the recording process may perform the restoration execution determination process, the data restoration process and the replay process of the optical disk.

In the above discussion, the physical address of the data recorded on the recording medium (the physical recording position on the recording medium) is contained in the salvage marker as information relating to the recording area (data location information). A logical address (a logical recording position on the recording medium) may be contained instead of containing the physical address in the salvage marker.

The salvage marker may contain information relating to the recording position of the immediately prior salvage marker on the recording medium.

The present invention is applicable to a disk-like recording medium other than the optical disk, and other random-access recording medium (such as a semiconductor memory). As long as data is managed in file, the present invention is applicable to any case in which the data is recorded onto a recording medium.

In the above discussion, content data, such as audio data and video data, and a file system (management data for managing the content data) are recorded onto the same recording medium. The present invention is applicable even if the content data and the file system (management data) are not recorded on the same recording medium. For example, in the case of package media having a disk medium (or a tape medium) and a semiconductor memory in a cartridge, the content data may be recorded on the disk medium (or the tape medium) while the file system may be recorded on the semiconductor memory. For example, of two apparatuses connected to a network, one apparatus may hold the content data while the other apparatus may hold the file system. The present embodiment may be applicable to cases, other than the above, in which the content data and the file system (management data) are not recorded on the same recording medium.

Although the above-described series of processes are performed using hardware, the processes may also be performed using software. If the processes are performed using software, the function of the disk recording and replay apparatus 10 is carried out by installing a program constituting the software in a computer, and by causing the computer to perform the program.

Figure 26:
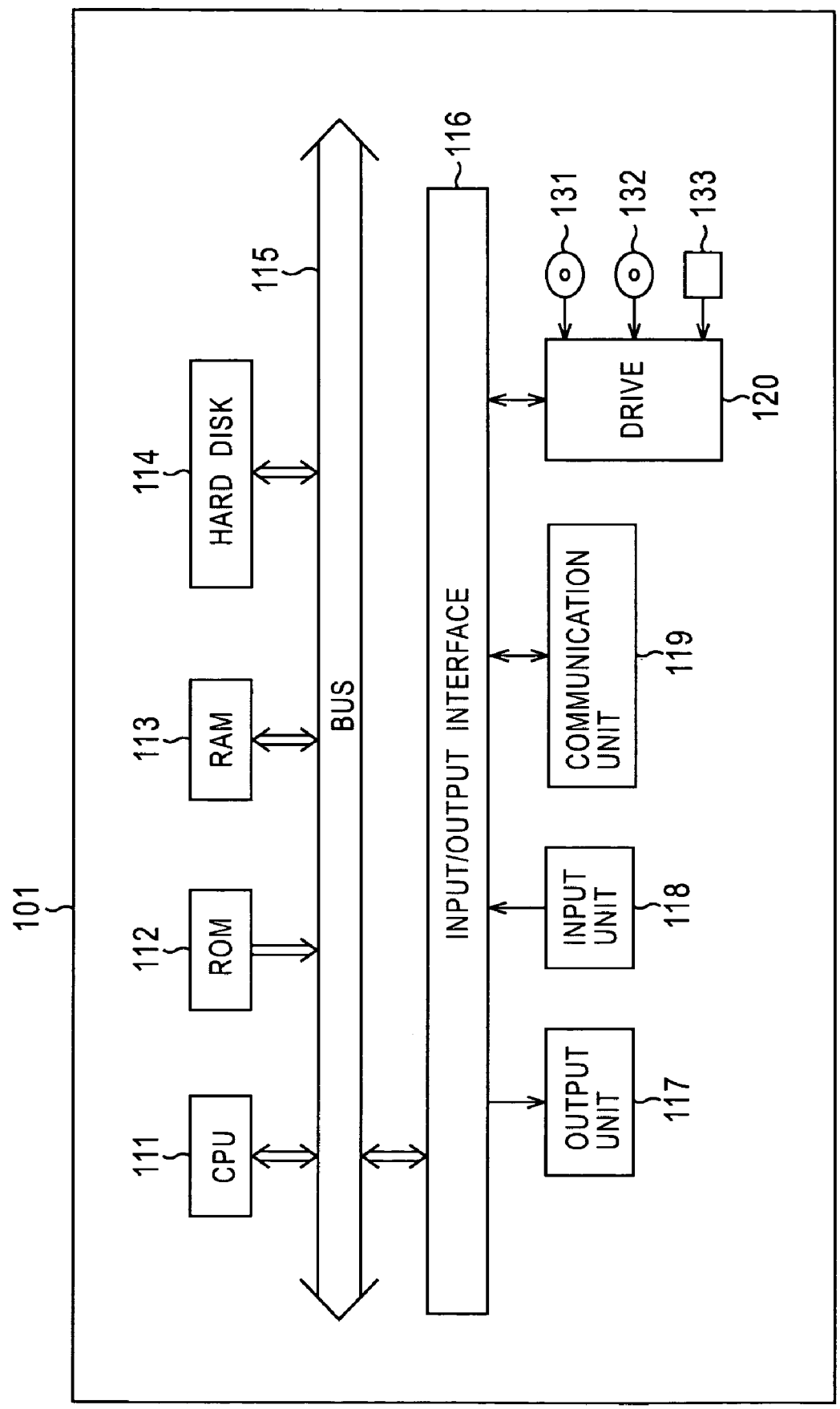
FIG. 26 is a block diagram illustrating the structure of a personal computer.

FIG. 26 is a block diagram illustrating the structure of one embodiment of a computer 101 functioning as the above-referenced disk recording and replay apparatus 10. A CPU (Central Processing Unit) 111 is connected to an input/output interface 116 through a bus 115. When a user inputs a command to the CPU 111 through the input/output interface 116 from an input unit 118 such as a keyboard or a mouse, an RAM (Random-Access Memory) 113 is loaded with the program which is stored in a recording medium such as an ROM (Read-Only Memory) 112, or a hard disk 114, or one of the recording media inserted into a drive 120, such as a magnetic disk 131, an optical disk 132, or a semiconductor memory 133, for execution. In this way, a variety of above-described processes are performed.

The CPU 111 outputs the process results thereof to an output unit 117 such as an LCD (Liquid-Crystal Display) through the input/output interface 116 as necessary. The program, stored beforehand in the hard disk 114 or the ROM 112, may be supplied together with the computer 101 to a user. The program may also be supplied in the magnetic disk 131, the optical disk 132, the semiconductor memory 133, or the like as a package medium. Alternatively, the program may be supplied to the hard disk 114 through a communication unit 119 via a satellite, a network, or the like.

Steps describing the program supplied in the recording medium (a program storage medium) may or may not be sequentially performed as described. If the steps are not performed sequentially, the steps may be performed individually or in parallel.

In this description, the system is intended to mean all the apparatuses if the system contains a plurality of apparatuses.

INDUSTRIAL APPLICABILITY

In accordance with the first invention, the data can be recorded on the recording medium.

In accordance with the first invention, the data can read from the recording medium, which has failed to end the recording process in a normal state.

In accordance with the second invention, the data can be replayed from the recording medium.

In accordance with the second invention, the data can read from the recording medium, which has failed to end the recording process in a normal state.

The invention claimed is:

1. A recording apparatus for recording data managed as files onto a recording medium, comprising:
   generator means for generating a marker that contains a recognition pattern set beforehand for each of segment files in which at least one of the files is segmented, and salvage processing information that is used in a salvage process of a file that is recorded on the recording medium but in an unrecognizable state as a file, and
   recording means for recording the segment file and the marker onto the recording medium so that the segment file and the marker are arranged on the recording medium in a predetermined order,
   wherein the salvage processing information contains information indicating a planned recording position, on the recording medium, of a following marker that is recorded on the recording medium in succession to the marker containing the salvage processing information,
      wherein, when a defect takes place at the planned recording position, the following marker is shifted to an actual recording position rightward to the planned recording position.

2. A recording apparatus according to claim 1, wherein the generator means generates the marker that contains the salvage processing information for each segment file of the plurality of segment files in which each file of the plurality of files is segmented, and
   the recording means records the plurality of segment files corresponding to each file of the plurality of files and the marker on the recording medium in the predetermined order.

3. A recording apparatus according to claim 2, wherein the salvage processing information contains information relating to a recording area of each of the segment files.

4. A recording apparatus according to claim 1, wherein the salvage processing information contains type information indicating the type of the data.

5. A recording apparatus according to claim 1, wherein the salvage processing information contains information for identifying each of the files.

6. A recording apparatus according to claim 1, wherein the salvage processing information contains information relating to the segment file arranged subsequent to the marker containing the salvage processing information.

7. A recording apparatus according to claim 1, wherein the salvage processing information contains information relating to the segment file arranged prior to the marker containing the salvage processing information.

8. A recording apparatus according to claim 1, wherein the salvage processing information contains information relating to the segment files arranged prior to and subsequent to the marker containing the salvage processing information.

9. A recording apparatus according to claim 1, wherein the salvage processing information contains time information corresponding to a timing of the recording of the marker.

10. A recording apparatus according to claim 1, wherein the salvage processing information contains information relating to the recording order of the marker.

11. A recording apparatus according to claim 1, wherein the salvage processing information contains information indicating a position, on the recording medium, of a defect taking place at the recording of the segment file arranged prior to the marker containing the salvage processing information.

12. A recording method for recording data managed as files onto a recording medium, comprising:
   a generating step for generating a marker that contains a recognition pattern set beforehand for each of segment files in which at least one of the files is segmented, and salvage processing information that is used in a salvage process of a file that is recorded on the recording medium but in an unrecognizable state as a file, and
   a recording step for recording the segment file and the marker onto the recording medium so that the segment file and the marker are arranged on the recording medium in a predetermined order, wherein the salvage processing information contains information indicating a planned recording position, on the recording medium, of a following marker that is recorded on the recording medium in succession to the marker containing the salvage processing information, wherein, when a defect takes place at the planned recording position, the following marker is shifted to an actual recording position rightward to the planned recording position.

13. A recording method according to claim 12, wherein the marker that contains the salvage processing information for each segment file of the plurality of segment files in which each file of the plurality of files is segmented is generated in the generating step, and the plurality of segment files corresponding to each file of the plurality of files and the marker are recorded on the recording medium in the predetermined order in the recording step.

14. A recording method according to claim 13, wherein the salvage processing information contains information relating to a recording area of each of the segment files.

15. A recording method according to claim 12, wherein the salvage processing information contains type information indicating the type of the data.

16. A recording method according to claim 12, wherein the salvage processing information contains information for identifying each of the files.

17. A recording method according to claim 12, wherein the salvage processing information contains information relating to the segment file arranged subsequent to the marker containing the salvage processing information.

18. A recording method according to claim 12, wherein the salvage processing information contains information relating to the segment file arranged prior to the marker containing the salvage processing information.

19. A recording method according to claim 12, wherein the salvage processing information contains information relating to the segment files arranged prior to and subsequent to the marker containing the salvage processing information.

20. A recording method according to claim 12, wherein the salvage processing information contains time information corresponding to a timing of the recording of the marker.

21. A recording method according to claim 12, wherein the salvage processing information contains information relating to the recording order of the marker.

22. A recording method according to claim 12, wherein the salvage processing information contains information indicating a position, on the recording medium, of a defect taking place at the recording of the segment file arranged prior to the marker containing the salvage processing information.

23. A computer-readable medium storing a program that when executed on a computer causes a recording processing for recording data managed as files onto a recording medium, the program comprising:

a generating step for generating a marker that contains a recognition pattern set beforehand for each of segment files in which at least one of the files is segmented, and salvage processing information that is used in a salvage process of a file that is recorded on the recording medium but in an unrecognizable state as a file, and a recording control step for controlling the recording of the segment file and the marker on the recording medium so that the segment file and the marker are arranged on the recording medium in a predetermined order, wherein the salvage processing information contains information indicating a planned recording position, on the recording medium, of a following marker that is recorded on the recording medium in succession to the marker containing the salvage processing information, wherein, when a defect takes place at the planned recording position, the following marker is shifted to an actual recording position rightward to the planned recording position.

24. A salvage apparatus comprising:

determining means for determining whether a recording process for recording a marker and a segment file on a recording medium in a predetermined order is normally completed, wherein the marker contains a recognition pattern set beforehand for each of the segment files in which at least one of files is segmented, and salvage processing information that is used in a salvage process of a file that is recorded on the recording medium but in an unrecognizable state as a file, detecting means for detecting at least one of the markers recorded on the recording medium based on the recognition pattern if the determining means determines that the recording of the file to the recording medium is not normally completed, identifying means for identifying data formed of the same file based on the salvage processing information contained in the marker, and registering means for registering the data identified by the identifying means as the data of the same file in a file system, wherein the salvage processing information contains information indicating a planned recording position, on the recording medium, of a following marker that is recorded on the recording medium in succession to the marker containing the salvage processing information, wherein, when a defect takes place at the planned recording position, the following marker is shifted to an actual recording position rightward to the planned recording position.

25. A salvage method comprising:

a determining step for determining whether a recording process for recording a marker and a segment file on a recording medium in a predetermined order is normally completed, wherein the marker contains a recognition pattern set beforehand for each of the segment files in which at least one of files is segmented, and salvage processing information that is used in a salvage process of a file that is recorded on the recording medium but in an unrecognizable state as a file, a detecting step for detecting at least one of the markers recorded on the recording medium based on the recognition pattern if the determining step determines that the recording of the file to the recording medium is not normally completed, an identifying step for identifying data formed of the same file based on the salvage processing information contained in the marker, and a registering step for registering the data identified in the identifying step as the data of the same file in a file system, wherein the salvage processing information contains information indicating a planned recording position, on the recording medium, of a following marker that is recorded on the recording medium in succession to the marker containing the salvage processing information, wherein, when a defect takes place at the planned recording position, the following marker is shifted to an actual recording position rightward to the planned recording position.

26. A computer-readable medium storing a program that when executed on a computer a salvage processing, the program comprising:

a determining step for determining whether a recording process for recording a marker and a segment file on a recording medium in a predetermined order is normally completed, wherein the marker contains a recognition pattern set beforehand for each of the segment files in which at least one of files is segmented, and salvage processing information that is used in a salvage process of a file that is recorded on the recording medium but in an unrecognizable state as a file, a detecting step for detecting at least one of the markers recorded on the recording medium based on the recognition pattern if the determining means determines that the recording of the file to the recording medium is not normally completed, an identifying step for identifying data formed of the same file based on the salvage processing information contained in the marker, and a registering step for registering the data identified in the identifying step as the data of the same file in a file system, wherein the salvage processing information contains information indicating a planned recording position, on the recording medium, of a following marker that is recorded on the recording medium in succession to the marker containing the salvage processing information, wherein, when a defect takes place at the planned recording position, the following marker is shifted to an actual recording position rightward to the planned recording position.

* * * * *

UNITED STATES PATENT AND TRADEMARK OFFICE
CERTIFICATE OF CORRECTION

PATENT NO. : 7,609,942 B2
APPLICATION NO. : 10/491378
DATED : October 27, 2009
INVENTOR(S) : Furukawa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1610 days.

Signed and Sealed this

Twelfth Day of October, 2010

David J. Kappos
*Director of the United States Patent and Trademark Office*